United States Patent
Yamamoto et al.

(10) Patent No.: US 8,295,479 B2
(45) Date of Patent: Oct. 23, 2012

(54) DATA CONVERSION FUNCTION PROCESSOR

(75) Inventors: Dai Yamamoto, Kawasaki (JP); Jun Yajima, Kawasaki (JP); Kouichi Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 309 days.

(21) Appl. No.: 12/834,247

(22) Filed: Jul. 12, 2010

(65) Prior Publication Data

US 2010/0278332 A1 Nov. 4, 2010

Related U.S. Application Data

(63) Continuation of application No. PCT/JP2008/000051, filed on Jan. 18, 2008.

(51) Int. Cl.
*H04L 9/06* (2006.01)
(52) U.S. Cl. .............................. 380/29; 380/37
(58) Field of Classification Search .............. 380/29, 380/37
See application file for complete search history.

(56) References Cited

U.S. PATENT DOCUMENTS

| | | | |
|---|---|---|---|
| 6,466,669 B1 * | 10/2002 | Matsui et al. ................ | 380/37 |
| 2002/0186841 A1 * | 12/2002 | Averbuj et al. .............. | 380/44 |
| 2004/0062391 A1 * | 4/2004 | Tsunoo ...................... | 380/42 |
| 2004/0131180 A1 * | 7/2004 | Mazuz et al. ................ | 380/37 |
| 2004/0156499 A1 | 8/2004 | Heo et al. | |
| 2006/0013388 A1 * | 1/2006 | Suen et al. .................. | 380/28 |

FOREIGN PATENT DOCUMENTS

| | | |
|---|---|---|
| JP | 10-333569 | 12/1998 |
| JP | 2004-240427 | 8/2004 |

OTHER PUBLICATIONS

Dai Yamamoto et al., "Compact Hardware Implementation of Blockcipher MISTY1", The 2008 Symposium on Cryptography and Information Security, The Institute of Electronics, Information and Communication Engineers, Jan. 2008, pp. 1-6.

Mitsuru Matsui, "Block Encryption Algorithm MISTY", Information R&D Center, Mitsubishi Electric Corporation, printed Aug. 17, 2010 from www.mitsubishielectric.co.jp/corporate/randd/information_technology/security/code/pdf/misty_j.pdf#page=1, pp. 1-8.

Mitsuru Matsui et al, "Fast Implementations of MISTY in Software (III)", Technical Report of IEICE, ISEC2000-81, The Institute of Electronics, Information and Communication Engineers, vol. 100, No. 421, Nov. 2000, pp. 13-21.

Encryption Technology Specification Misty1, Mitsubishi Electric Corporation, May 13, 2002, 8 pp.

Toru Sorimachi et al., "On the criteria of hardware evaluation of block ciphers (2)", IEICE Technical Report (ISEC2001), The Institute of Electronics, Information and Communication Engineers, vol. 101, No. 311, Sep. 2001, pp. 9-16.

International Search Report issued in corresponding International Patent Application PCT/JP2008/000051.

* cited by examiner

*Primary Examiner* — Gilberto Barron, Jr.
*Assistant Examiner* — Shaun Gregory
(74) *Attorney, Agent, or Firm* — Staas & Halsey LLP

(57) ABSTRACT

In a MISTY1 FI function, an exclusive OR to which a round key KIij2 is inputted is arranged between an exclusive OR arranged on a 9-bit critical path in a first MISTY structure and a zero-extend conversion connected to the branching point of a 7-bit right system data path. Then, a 9-bit round key KIij1 is truncate-converted to seven bits, the exclusive OR of the seven bits and the round key KIij1 is calculated by an exclusive OR and the calculation result is inputted to an exclusive OR arranged on the right system data path in the second stage MISTY structure.

20 Claims, 30 Drawing Sheets

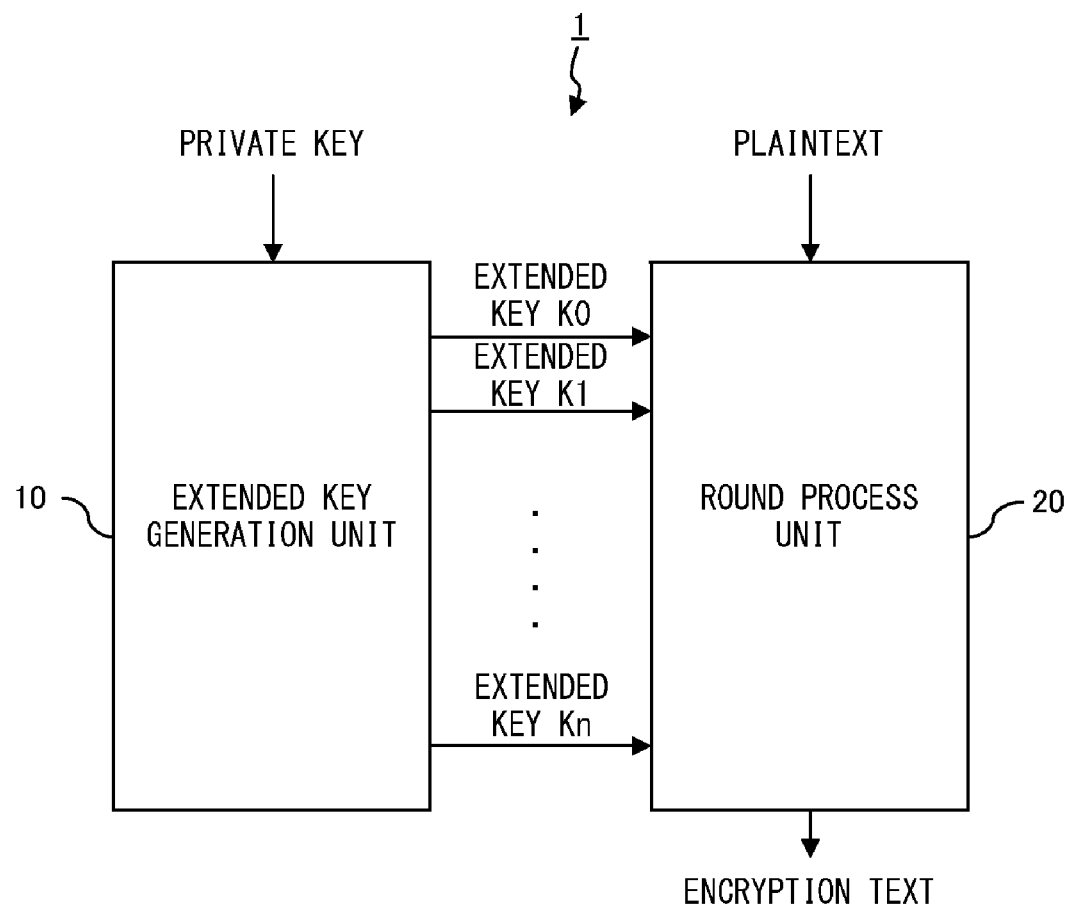
F I G. 1

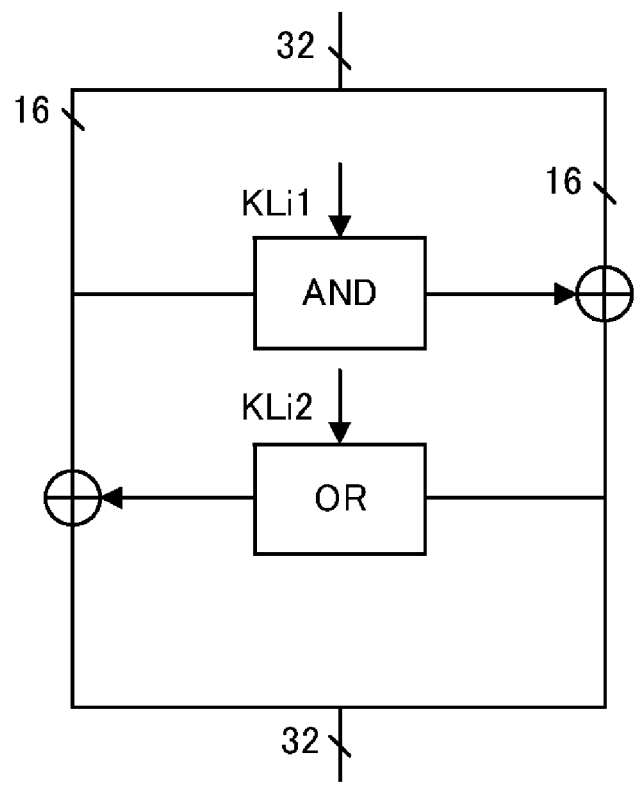
F I G. 5 A

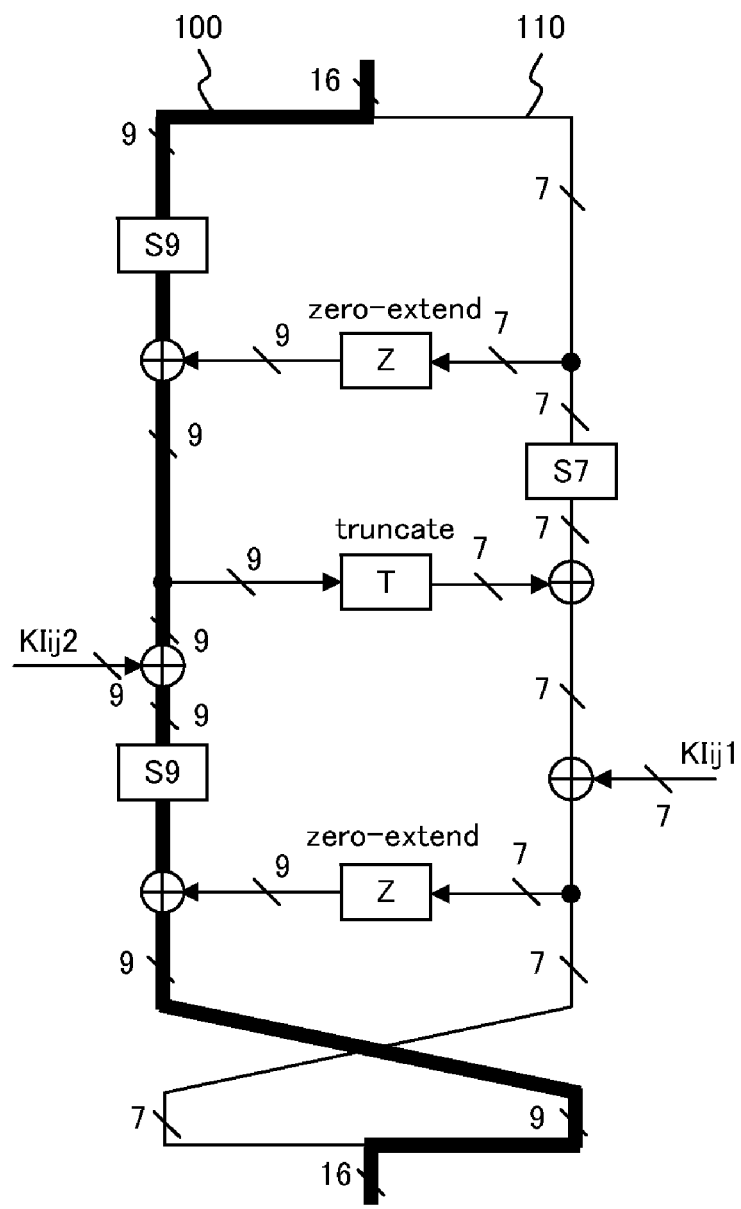
F I G. 6

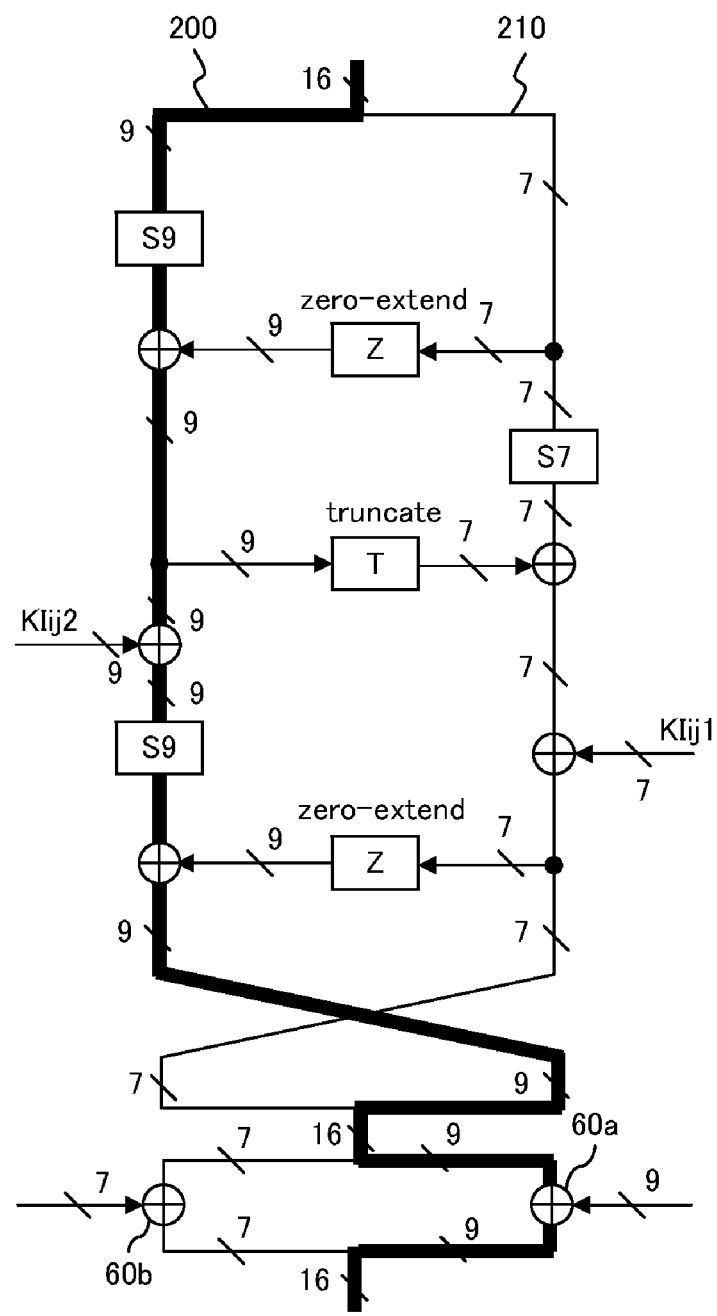
F I G. 7

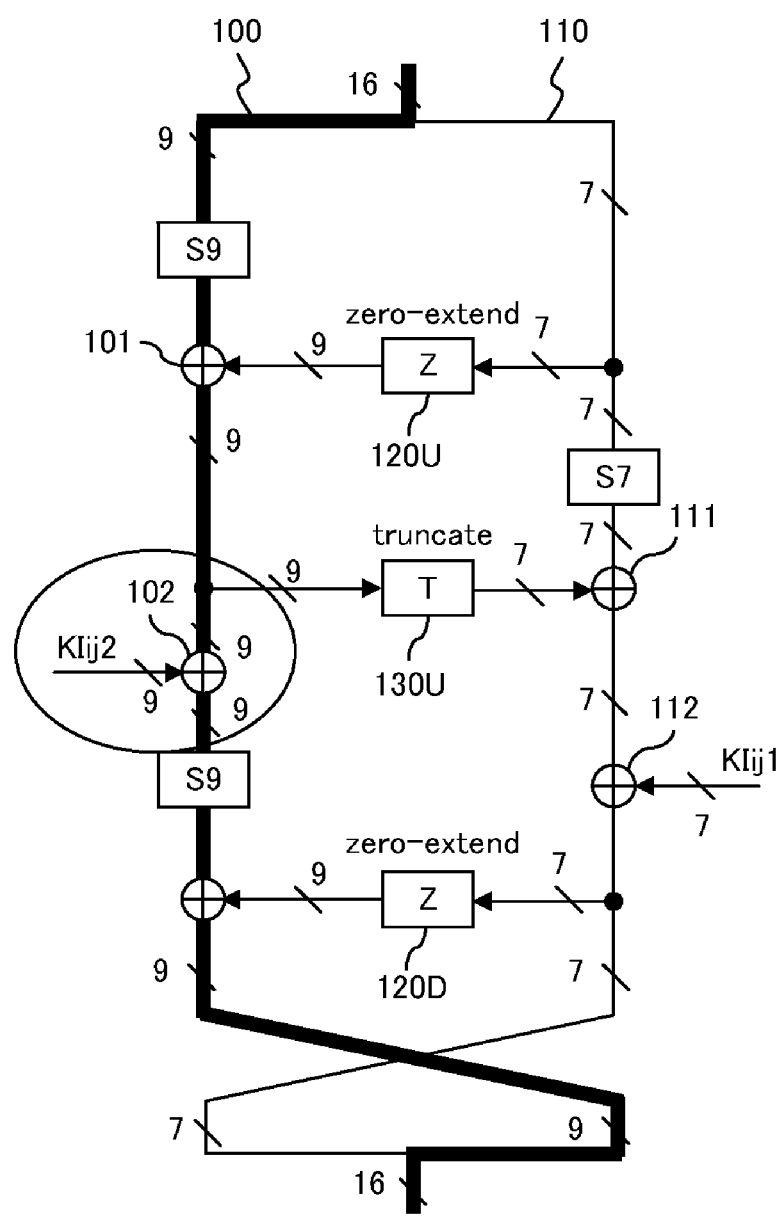
F I G. 8A

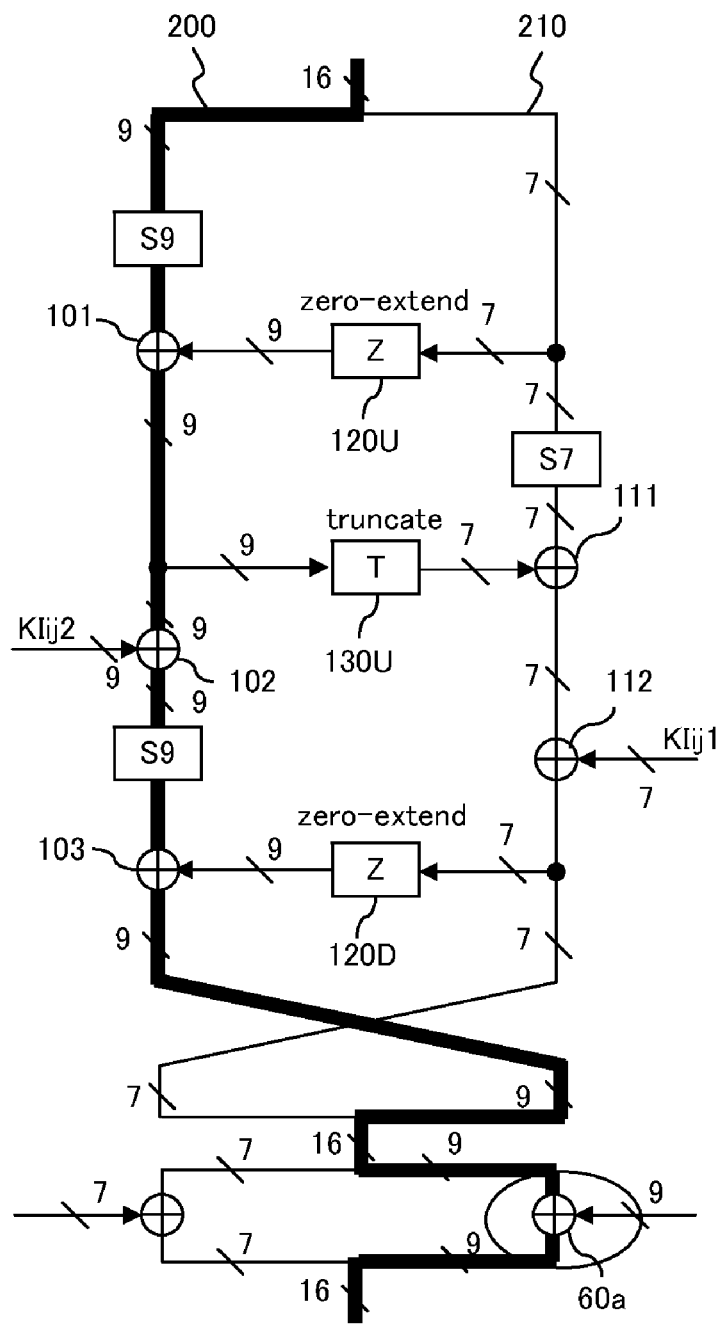
F I G. 9A

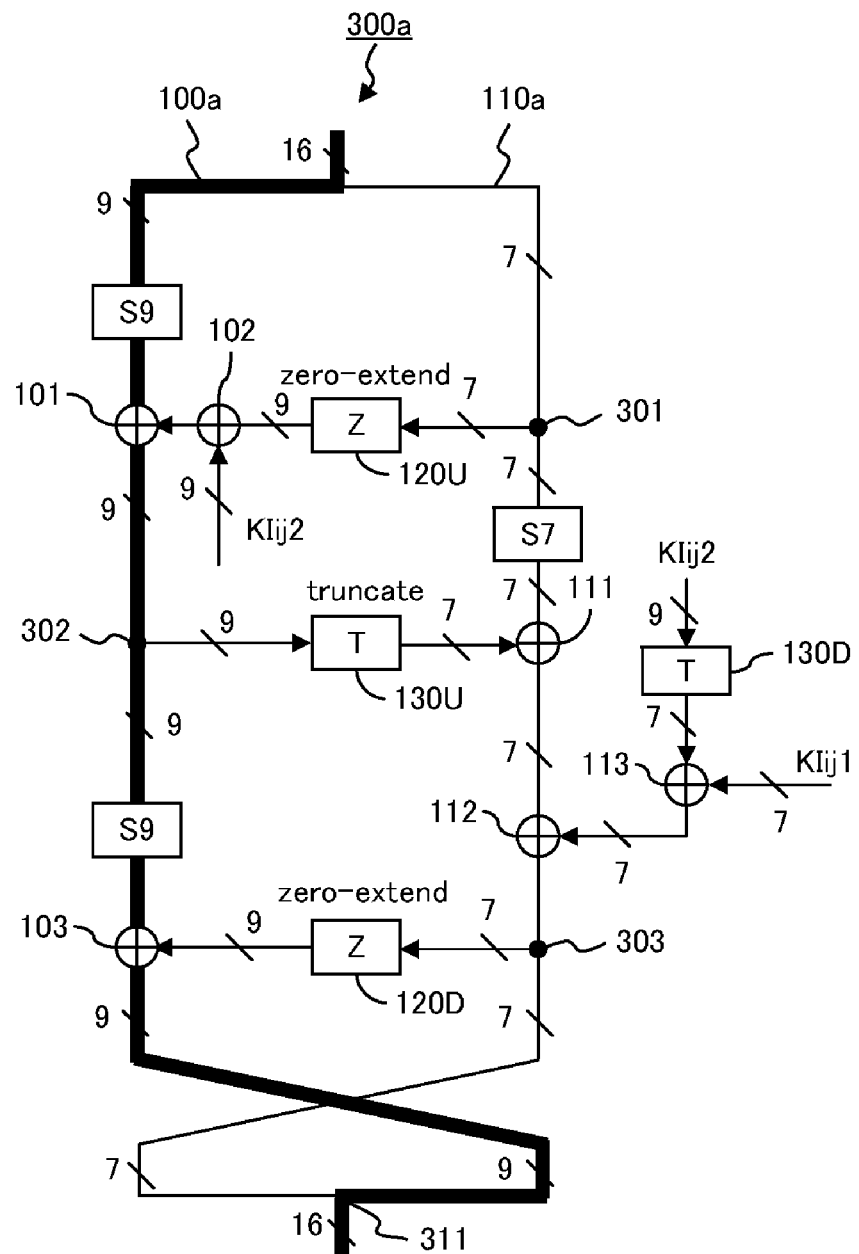
F I G. 10

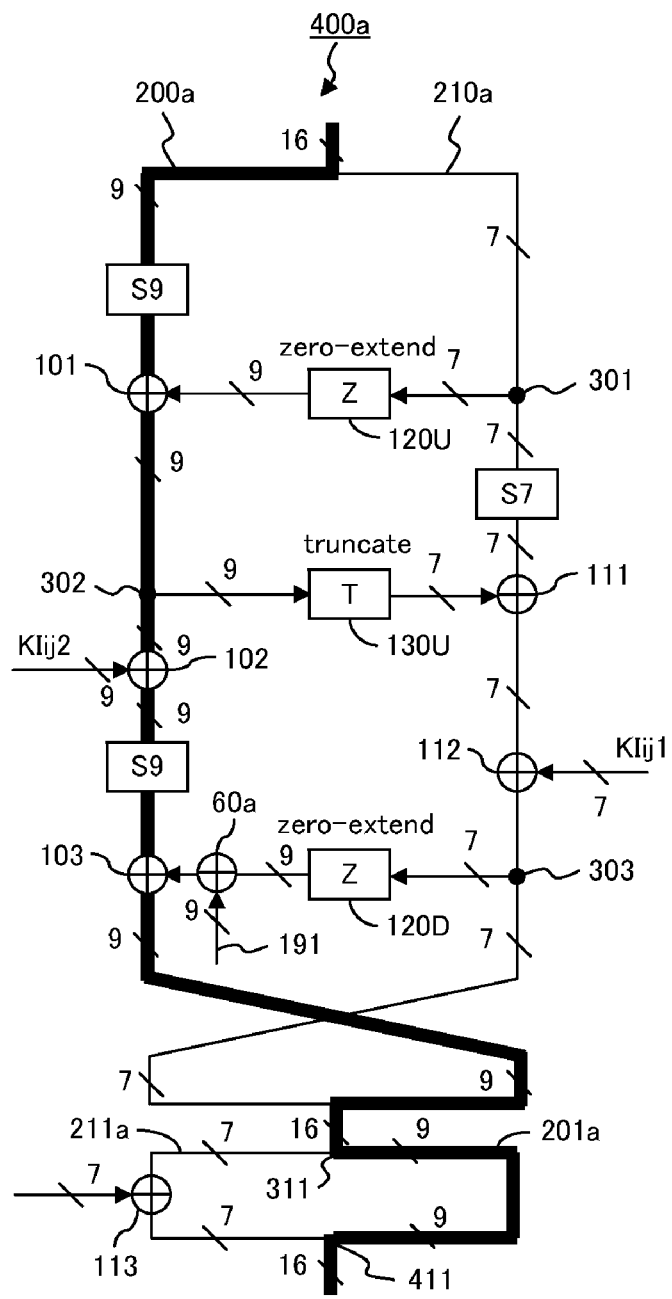
F I G. 1 1

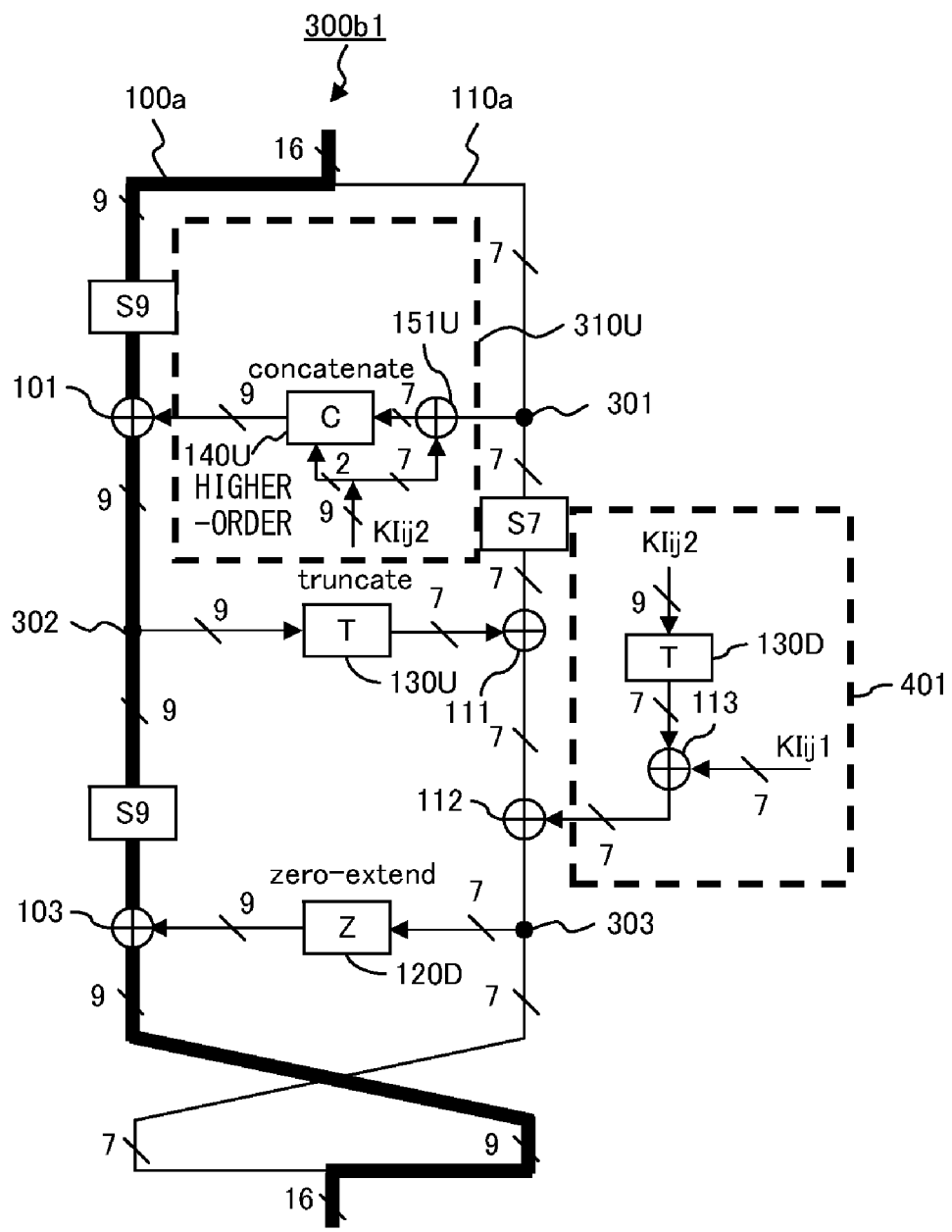
F I G. 1 3 A

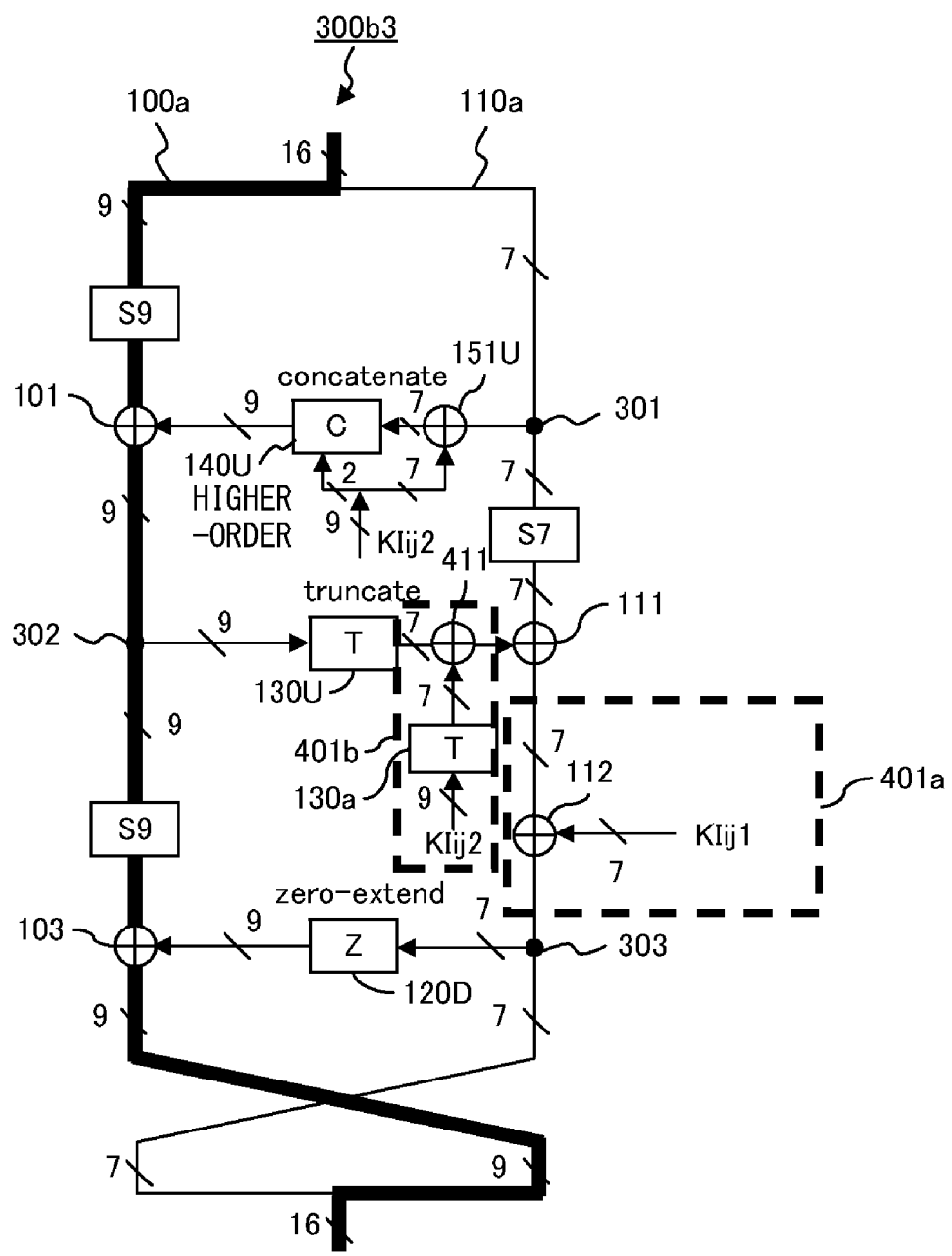
F I G. 13C

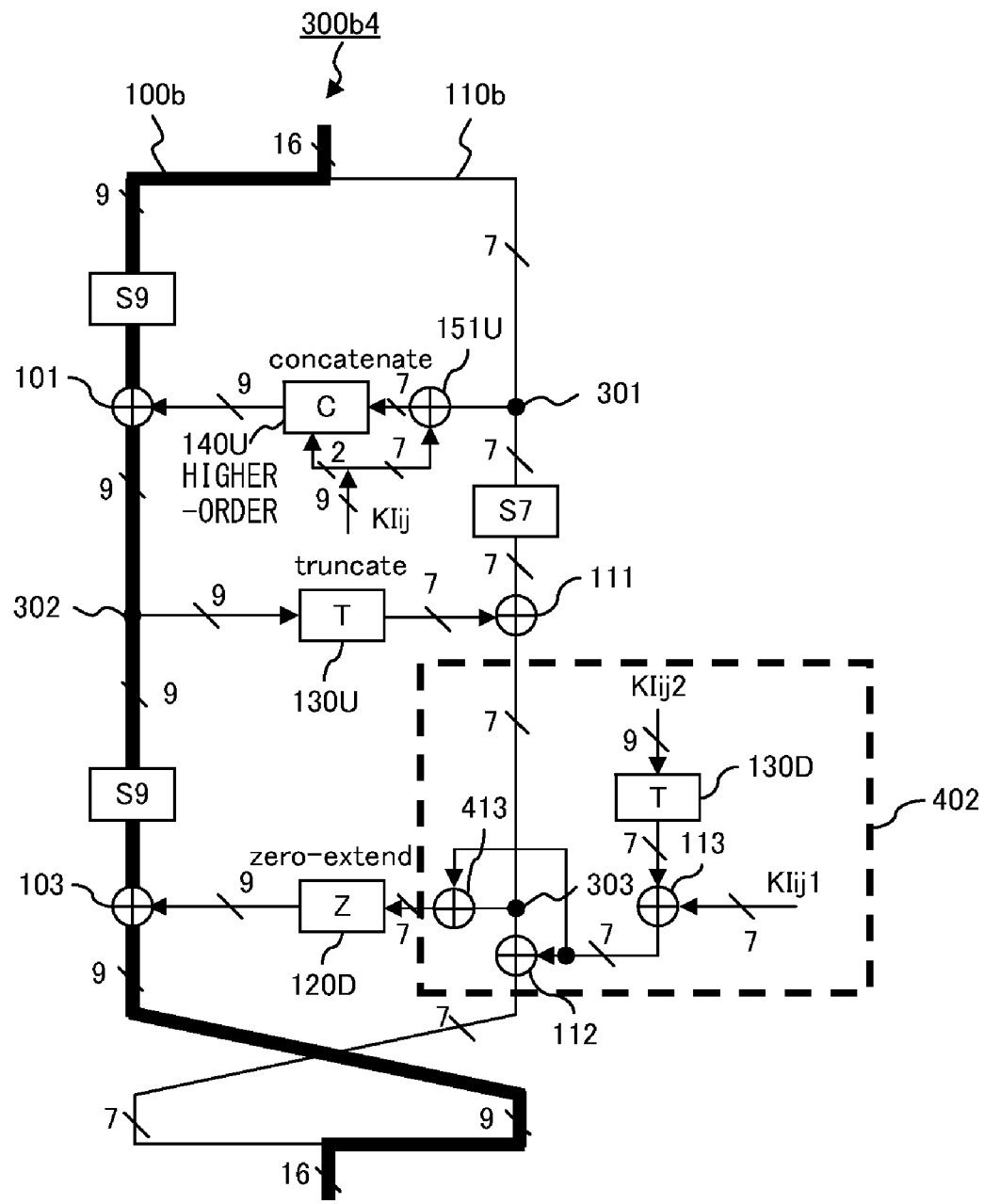
F I G. 13D

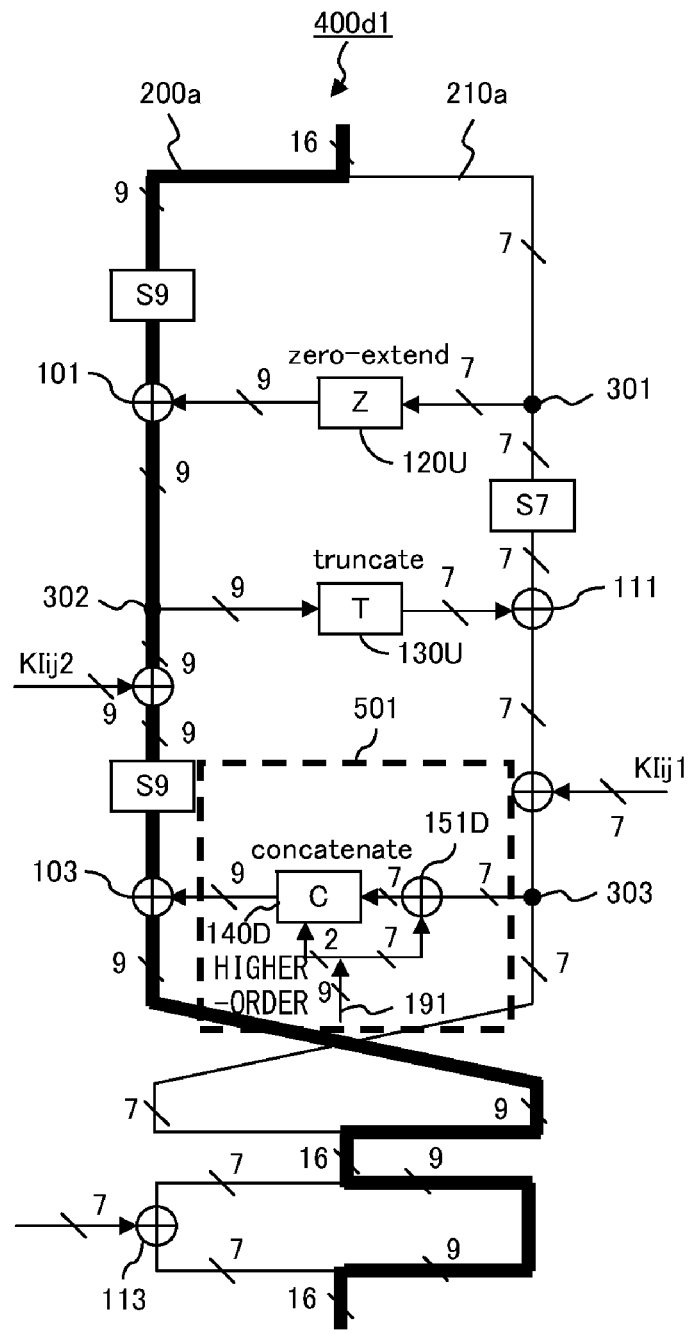
F I G. 15A

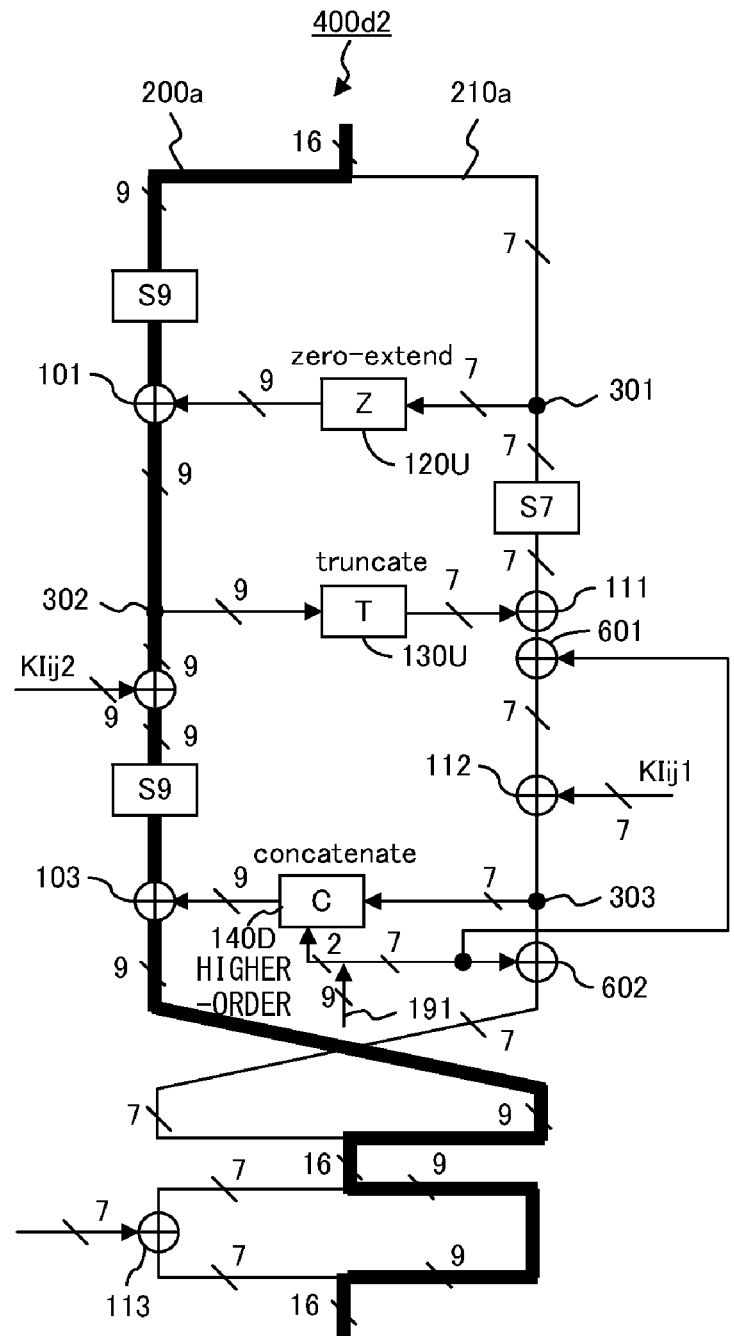
F I G. 15B

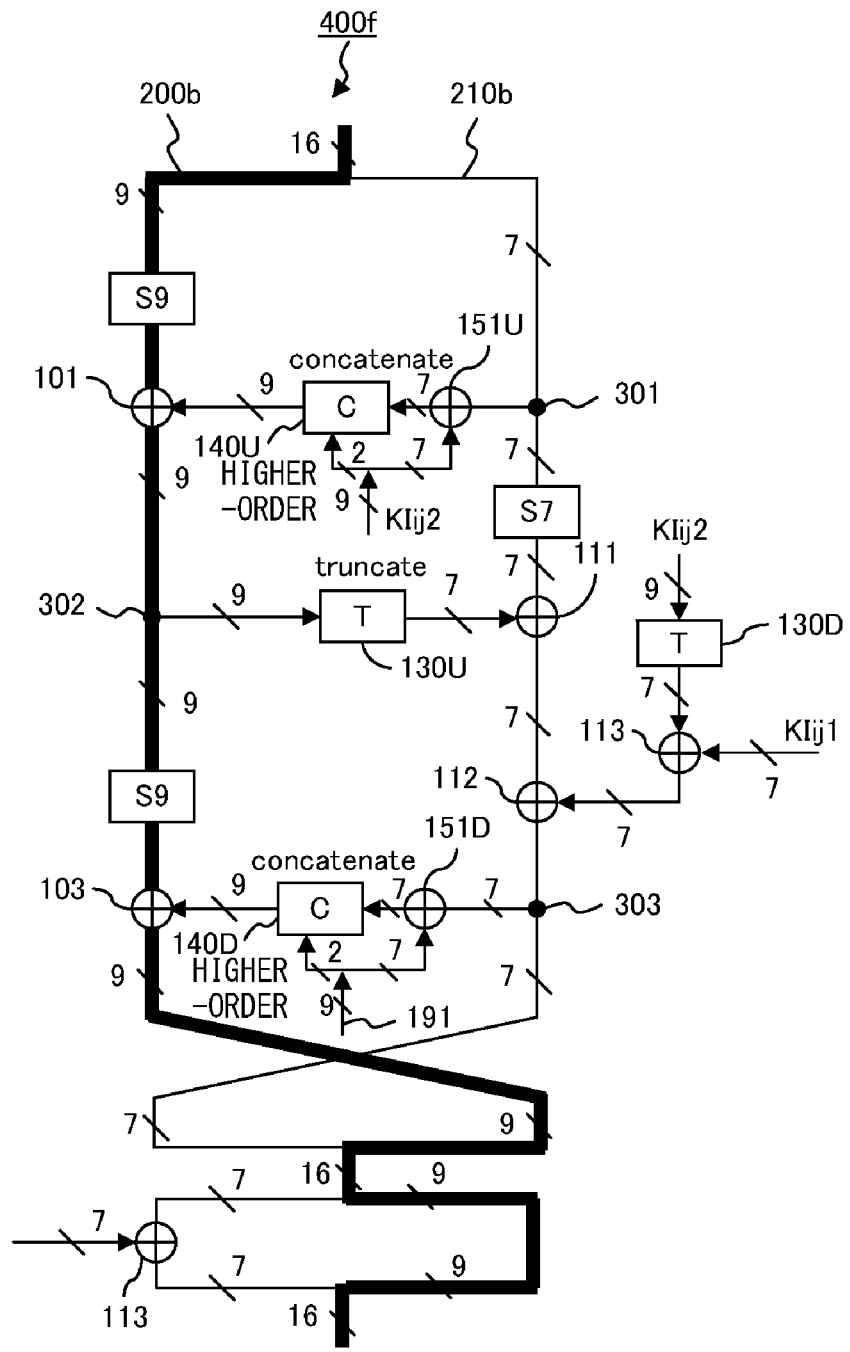
F I G. 17

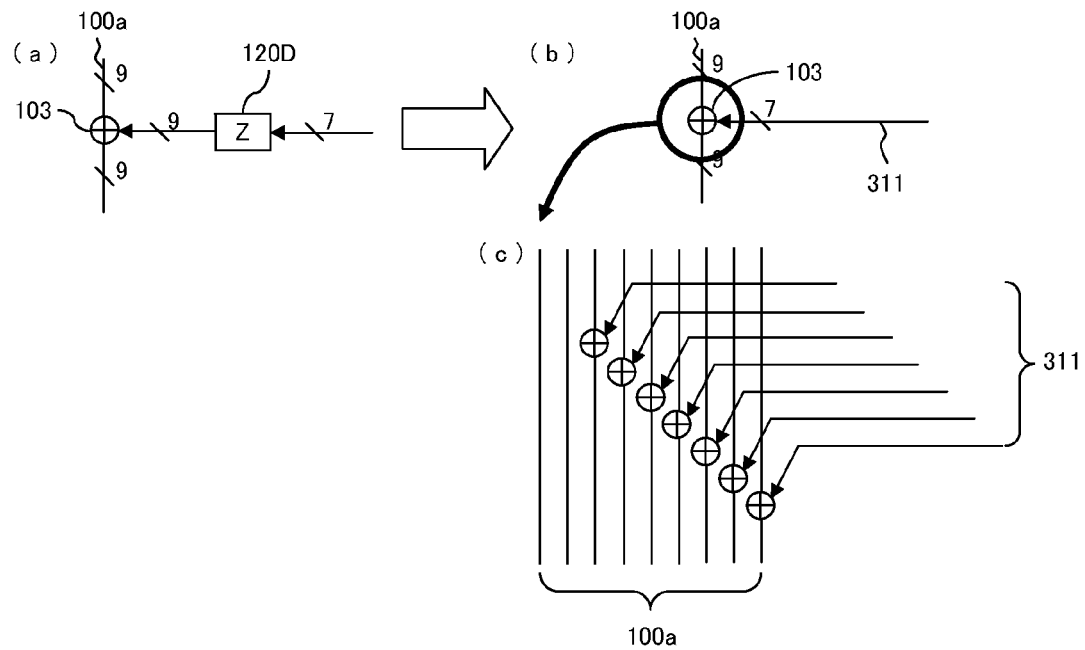
F I G. 1 9

US 8,295,479 B2

DATA CONVERSION FUNCTION PROCESSOR

CROSS-REFERENCE TO RELATED APPLICATIONS

This application is a continuation of PCT application No. PCT/JP2008/000051, which was filed on Jan. 18, 2008, the entire contents of which are incorporated herein by reference.

FIELD

The embodiment discussed herein is related to a common key encryption technology, and more particularly to a data conversion function processor in a MISTY structure.

BACKGROUND

A cryptography is roughly divided into two categories: public key cryptography and a common key cryptography. The public key cryptography uses different keys for encryption and decryption and ensures the security of transmitting information by letting only a receiver know a decryption key for decoding a cipher text (private key) instead of publicly opening a encryption key (public key). However, the common key cryptography uses the same keys for encryption and decryption and ensures the security of transmitting information by preventing the private key from being known by a third party other than a transmitter and a receiver.

When the common key encryption is compared with the public key encryption, the common key encryption has an advantage that its process speed is faster and it can be compactly implemented. Therefore, when an encryption function is added to a small-size device, such as a cellular phone, an IC card and the like, a common key encryption is often used. Since its process speed is higher and it can encrypts/decrypts information in real time, it can be also used for information communications in the fields of broadcast and communications.

The common key encryption is divided into two categories: stream cipher and block cipher. Currently, the block cipher is often used for the common key encryption from the viewpoint of security. The block cipher divides a plaintext (text to be encrypted) into groups with a certain bit length (called a "block") and encrypts it in units of groups. The bit length of a block being the process unit of encryption is called a "block length".

As to the common key block cipher, various algorithms are known according to its block length. DES, AES, SC2000, MISTY (MISTY 1 and MISTY 2), KASUMI and the like are its typical ones. These block cipher algorithms are implemented by software or hardware.

FIG. 1 is a general basic configuration of data conversion function processor in a common key encryption.

The data conversion function processor 1 in common key encryption includes an extended key generation unit 10 and a round process unit 20. The extended key generation unit 10 generates a plurality of extended keys K0, K1, K2, ... and Kn (n is a natural number) from an input private key (common key) and outputs them to the round process unit 20. The round process unit 20 converts and outputs an input plaintext to an cipher text by using the plurality of extended keys K1 through Kn inputted from the extended key generation unit 10.

Next, the MISTY 1 being one of common key encryptions will be explained. The MISTY 1 is a common key encryption with a 64-bit block length and a 128-bit key length, and converts a 64-bit plaintext to a 64-bit cipher text by using a 128-bit private key. Therefore, a data conversion function processor in MISTY 1 is configured in such a way that a 128-bit private key and a 64-bit plaintext are input to extend key generation unit 10 and the round process unit 20, respectively.

[Summary of MISTY 1]

The detailed configuration of the MISTY1 data conversion function processor will be explained below.

{Configuration of Round Process Unit}

Firstly, the configuration of the round process unit 20 will be explained. In the MISTY 1, it is regulated that the number of stages of a round process is the multiple times of 4 and eight stages are recommended. Therefore, the configuration of the round process unit 20 whose number of stages is 8 will be explained below.

FIGS. 2A and 2B are the configurations of the MISTY 1 round process unit. FIGS. 2A and 2B are the configurations of round process units for encryption and decryption, respectively.

As illustrated in FIGS. 2A and 2B, the MISTY1 round process unit is Feistel-structured. Next, the Feistel structure will be briefly explained. The Feistel structure divides an input into two of right and left blocks. Then, it inputs the left block (hereinafter called a "block L") to an F function (FO function in the case of the MISTY 1), calculates the exclusive OR of the output of the F function and the right block (hereinafter called a "block R"). Then, after the completion of the logical calculation process, it replaces the block L with the block R. The F function is also called a "round function". The F function is a "data conversion function" in abroad sense.

As illustrated in FIG. 2A, the MISTY 1 round process unit 20a for encryption is composed by combining FL functions 30a (FL1-FL10), FO functions 40 (FO1-FO8) and an exclusive OR 50. As illustrated in FIG. 2B, the round process unit 20b for decryption is composed by vertically inverting and arranging the respective components of the round process unit 20a for encryption and an $FL^{-1}$ function 30b being its inverse function is arranged instead of the FL function 30a. The MISTY 1 round process unit 20a for encryption inputs a 64-bit plaintext P, converts it to a 64-bit cipher text C and outputs it. The MISTY 1 round process unit 20b for decryption inputs the 64-bit cipher text C, decrypts it to the 64-bit plaintext P and outputs it. The MISTY 1 round process unit 20a for encryption and the MISTY 1 round process unit for decryption 20b perform encryption and decryption processes, respectively, using the extended keys generated by the extended key generation unit 10.

The MISTY 1 generates a 128-bit extended key K' from the 128-bit private key K by performing an extended key generation process. This extended key K' is used for the FO function, the FL function, the $FL^1$ function and an FI function. The detailed generation process of an extended key will be described later.

The configurations of a FOi (i=1 to 8) and a FIij (i=1 to 8 and j=1 to 8) are illustrated in FIGS. 3 and 4, respectively. The configurations of a FLi (i=1 to 8) and a $FLi^{-1}$ (i=1 to 8) are illustrated in FIGS. 5A and 5B, respectively.

As illustrated in FIG. 3, the FO function is a function in a MISTY structure which inputs 32-bit data, converts it to 32-bit data and outputs it and includes an FI function and an exclusive OR. The 32-bit input data is divided into two of 16 bits and is processed. The FOi function converts data by the FI function and the exclusive OR, using round keys KOi1 through KOi4 and round keys KIi1 through KIi3.

As illustrated in FIG. 4, the FI function is a function in a MISTY structure which inputs 16-bit data, converts it to 16-bit data and outputs it. The 16-bit data inputted to the FI function is divided into left nine bits and right seven bits and is converted by a non-linear function (non-linear conversion) S7 and S9, zero-extend and truncate. The zero-extend converts 7-bit data to 9-bit data by adding two higher-order bits ("00") to 7-bit data. The truncate converts 9-bit data to 7-bit data by deleting two higher-order bits from 9-bit data. The FIij function converts data using keys KIij1 and KIij2. The KIij 1 and KIij2 are the 7-bit left data and the 9-bit right data, respectively, of the round key KIij.

Next, the MISTY structure will be explained. The MISTY structure constitutes the respective stages of the FO and FI functions. As illustrated in FIG. 3, the MISTY structure of the FO function arranges a first exclusive OR for inputting a round key KOij (j=1 to 3) to a left system data path, an FI function for inputting a round key KIij (j=1 to 3) below it and a second exclusive OR below the FI function, and calculates the exclusive OR of the output of the FI function and data branched and inputted from a right system data path by the second exclusive OR. Then, the calculation result of the second exclusive OR is inputted to the right system data path in a subsequent stage. Data flowing through the right system data path in the previous stage is inputted to the left system data path in a subsequent stage. As illustrated in FIG. 4, in the case of an FI function, in the above-described MISTY structure of the FO function, the FI function is replaced with a non-linear function S9 or S7 and one or two exclusive Ors are arranged below the non-linear function. The exclusive OR arranged immediately below the non-linear function S9 or S7 corresponds to the second exclusive OR in the MISTY structure of the FO function. Although the configuration of the MISTY structure is explained using the MISTY structures of an FO function and an FI function as examples above, other data conversion functions than these have various types of MISTY structures.

As illustrated in FIGS. 5A and 5B, the FL function and the $FL^{-1}$ function input 32-bit data, convert it to 32-bit data and output it. The 32-bit input data is divided into two of 16 bits and is processed. The FL function is converted by an AND and an OR. KLi1 and KLi2 are the first and second 16-bit data, respectively, from the left of a round key KLi. The $FL^{-1}$ function has an arrangement obtained by vertically inverting the respective components of the FL function. The $FL^{-1}$ function decrypts the 32-bit data encrypted by the FL function.

{Configuration of Extended Generation Key Process Unit}

Next, the configuration of the extended key generation unit 10 for generating a round key used for the above FO function, FI function, FL function and $FL^{-1}$ function will be explained.

The extended key generation unit 10 generates a 128-bit extended key K' from a 128-bit private key K. In this case, the private key K is divided in units of 16 bits and it is defined that the i-th 16-bit data from the left is Ki (i=1 to 8). The extended key K' is divided in units of 16 bits and it is defined that the i-th 16-bit data from the left is K'i (i=1 to 8). It is assumed that K9=K1. It is defined that when i exceeds eight, Ki and K'i mean $K_{i-8}$ and $K'_{i-8}$, respectively.

The extended key generation unit 10 generates an extended key K' from a private key K, using the FI function. The configuration of the extended key generation unit 10 is disclosed in FIG. 5 of the above non-patent document 1. The relations between the round keys KOij, KIij and KLij and actual keys (private key K and extended key K') are as illustrated in the following Table 1.

|  | KOi1 | KOi2 | KOi3 | KOi4 | Kii1 | Kii2 | Kii3 | KLi1 | KLi2 |
|---|---|---|---|---|---|---|---|---|---|
| Key | $K_i$ | $K_{i+2}$ | $K_{i+7}$ | $K_{i+4}$ | $K'_{i+5}$ | $K'_{i+1}$ | $K'_{i+3}$ | $K_{(i+1)/2}$ (when i is odd) $K'_{i/2+2}$ (when i is even) | $K'_{(i+1)/2+6}$ (when i is odd) $K'_{i/2+4}$ (when i is even) |

As described above, the MISTY 1 includes an FO function, an FL function, an $FL^{-1}$ function and an exclusive OR. As described above, the FO function includes an FI function and an exclusive OR. The extended key generation unit 10 generates an extended key K' using the FI function. Therefore, the process time of the FI function occupies a large weight in the entire process time (time required for encryption and decryption processes) of the MISTY 1. Therefore, in the high-speed implementation of hardware in the MISTY 1, the performance of the FI function becomes an important factor for determining the performance of the MISTY 1. Therefore, in the high-speed implementation of hardware in the MISTY 1, it is required that the FI function is optimized.

{Configuration of Conventional FI Function}

FIG. 6 illustrates how to implement a conventional FI function. FIG. 6 is obtained by modifying the description of an FI function, disclosed in the specification of the MISTY 1 illustrated in FIG. 4 to a logically equivalent description.

As illustrated in FIG. 6, in the FI function, inputted 16-bit data is divided into left nine bits and right seven bits. The above 9-bit data and 7-bit data are processed on the left (left system) paths 100 and right (right system) paths 110, respectively. In FIG. 6, a route (data path) becoming a critical path in the FI function is indicated by a thick line 100. In this case, the critical path means a route (data path) in which its process time becomes a maximum in the FI function.

A critical path 100 includes two non-linear functions (non-linear conversion) S9 and three exclusive Ors and process all pieces of data in nine bits. The non-linear function S9 is a 9-bit input/output non-linear function and its hardware implementation is made by a non-linear conversion table or the like. This non-linear conversion table is implemented, for example, in semiconductor memory, such as ROM (read-only memory) or the like. Thus, since the process of the non-linear function S9 accompanies a memory access, its process time increases compared with the process of an exclusive OR.

FIG. 7 is a configuration including FI functions (FIi1 to FIi3) and an exclusive OR 60 positioned immediately below it, in each round of the FO function illustrated in FIG. 3.

Exclusive ORs 60a and 60b illustrated in FIG. 7 are obtained by dividing the 16-bit exclusive OR 60 illustrated in FIG. 3 into a 9-bit exclusive OR and a 7-bit exclusive OR, respectively. The exclusive ORs 60a and 60b are the 9-bit and 7-bit exclusive ORs, respectively. A critical path 200 illustrated in FIG. 7 includes two non-linear functions S9 and four exclusive Ors and processes all pieces of data in nine bits. The right system path 210 includes one non-linear function S7 and three exclusive ORs and processes all pieces of data in seven bits.

In order to process the FI and FO functions in high speed, it is good idea that the critical paths 100 and 200 illustrated in FIGS. 6 and 7 is shortened. In this case, "the shortening of a critical path" means the deletion of the components of the critical path. However, in the FI function of the MISTY 1, a 16-bit input is divided into the different number of bits of 9 bits and 7 bits, which are processed two of left and right paths (data paths), respectively. Thus, since FI function has a non-uniform structure in which the respective numbers of bits of data paths differ between the left and right systems, it is not easy to perform a logical conversion while maintain its equivalence. Therefore, difficulty in logical conversion becomes an obstacle in the high-speed process of the FI function in the MISTY 1.

Patent document 1: Japanese Laid-open Patent Publication No. 2004-240427
Patent document 2: Japanese Patent No. 3088337
Non-patent document 1: Encryption technology specification MISTY 1
Non-patent document 2: Mitsuru Matsui, "Block Encryption Algorithm MISTY 1", Technical Report of IEICE, ISEC96-11 (July 1996)

SUMMARY

The first data conversion function processor of the present invention presumes performing a data conversion function process having a non-uniform MISTY structure which includes a n-bit data path and a m-bit data path, and the two data paths are connected by zero-extend conversion or truncate conversion in each stage. In this case, m<n.

The first aspect of a first data conversion function processor includes a zero-extend conversion unit provided on a route connecting between two data paths, to convert m bits branched and inputted from the data path of the m bits to n bits by zero-extend conversion, a first exclusive OR calculator provided on a route connecting between the two data paths, to calculate the exclusive OR of the n bits outputted from the zero-extend conversion unit and an n-bit round key KIij2, a second exclusive OR calculator to calculate the exclusive OR of the lower-order m bits of the round key KIij2 and an m-bit round key KIij1 and a third exclusive OR calculator provided on the m-bit data path, to calculate the exclusive OR of m bits outputted from the second exclusive OR calculator and the m bits inputted from the m-bit data path.

The second aspect of a first data conversion function processor includes a first exclusive OR calculator provided on a route connecting between the two data paths, to calculate the exclusive OR of the m bits branched and inputted from the m-bit data path and the lower-order m bits of the n-bit round key KIij2, a concatenate conversion unit provided on a route connecting between the two data paths, to combine m bits outputted from the first exclusive OR calculator with the (n−m) bits of the round key KIij2 by concatenate conversion to convert it to n bits, a second exclusive OR calculator to calculate the exclusive OR of the lower m bits of the round key KIij2 and an m-bit round key KIij1 and a third exclusive OR calculator provided on the m-bit data path, to calculate the exclusive OR of m bits outputted from the second exclusive OR calculator and m bits inputted from the m-bit data path.

The third aspect of a first data conversion function processor includes a first exclusive OR calculator to calculate the exclusive OR of m bits inputted from the m-bit data path and the lower m bits of an n-bit round key KIij2, a concatenate conversion unit provided on a route connecting between the two data paths, to combine m bits outputted from the first exclusive OR calculator with the (n−m) bits of the round key KIij2 by concatenate conversion to convert it to n bits, a second exclusive OR calculator provided at the lower section of a branching point to the route of the m-bit data path, to calculate the exclusive OR of m bits outputted from the first exclusive OR calculator and the lower m bits of the round key KIij2, a third exclusive OR calculator to calculate the exclusive OR of the lower-order m bits of the round key KIij2 and an m-bit round key KIij1 and a fourth exclusive OR calculator provided on the m-bit data path, to calculate the exclusive OR of m bits outputted from the third exclusive OR calculator and m bits inputted from the m-bit data path.

The fourth aspect of a first data conversion function processor includes a first exclusive OR calculator provided on a route connecting between the two data paths, to calculate the exclusive OR of m bits branched and inputted from the m-bit data path and the lower-order m bits of an n-bit round key KIij2, a concatenate conversion unit provided on a route connecting between the two data paths, to combine m bits inputted from the first exclusive OR calculator with the (n−m) bits of the round key KIij2 by concatenate conversion to convert it to n bits, a first truncate conversion unit to truncate-convert a n-bit round key KIij2 to m-bits, a second truncate conversion unit provided on a second route connecting between the two data paths, to truncate-convert n bits branched and inputted from the n-bit data path, to m bits, a second exclusive OR calculator provided on the second route, to calculate the exclusive OR of m bits outputted from the second truncate conversion unit and m bits outputted from the first truncate conversion unit, a third exclusive OR calculator provided on the m-bit data path, to calculate the exclusive OR of m bits outputted from the second exclusive OR calculator and m bits inputted from the m-bit data path and a fourth exclusive OR calculator provided on the m-bit data path, to calculate the exclusive OR of m bits outputted from the third exclusive OR calculator and an m-bit round key KIij1.

The fifth aspect of a first data conversion function processor includes a first exclusive OR calculator provided on a route connecting between the two data paths, to calculate the exclusive OR of m bits branched and inputted from the m-bit data path, and the lower-order m bits of an n-bit round key KIij2, a concatenate conversion unit provided on a route connecting between the two data paths, to combine m bits outputted from the first exclusive OR calculator with the (n−m) bits of the round key KIij2 by concatenate conversion to convert it to n bits, a second exclusive OR calculator to calculate the exclusive OR of the lower-order m bits of the round key KIij2 and an m-bit round key KIij1, a third exclusive OR calculator provided on the m-bit data path, to calculate the exclusive OR of m bits outputted from the second exclusive OR calculator and m bits inputted from the m-bit data path, a fourth exclusive OR calculator provided on a second route connecting between the two data paths, to calculate the exclusive OR of m bits inputted from a branching point provided in the upper section of the third exclusive OR calculator on the m-bit data path and m bits outputted from the second exclusive OR calculator and a zero-extend conversion unit provided on the second route, to zero-extend-convert m bits outputted from the fourth exclusive OR calculator to n bits.

In one of the first through fifth aspects of the first data conversion function processor, for example, an exclusive OR calculator is arranged immediately below a n-bit input/output non-linear converter Sn at a connecting point between a route connecting between the two data paths and the n-bit data path.

In one of the first through fifth aspects of the first data conversion function processor, for example, an m-bit input/output non-linear converter Sm is provided immediately below a connecting point between a route connecting between the two data paths and the m-bit data path.

According to the first data conversion function processor of the present invention, the circuit configuration of a data conversion function in a non-uniform MISTY structure including a n-bit data path and a m-bit data path is modified to a configuration from which an exclusive OR calculator to which a round key KIij2 arranged on an n-bit data path is inputted is excluded from the n-bit data path. This modification is made in such away as to ensure the logical equivalence of the entire function. Thus, the number of exclusive OR calculators arranged on the critical path (n-bit data path in this case) of the data conversion function can be reduced compared with the conventional data conversion function. Therefore, the process speed of a data conversion function processor in a non-uniform MISTY structure including an n-bit data path and an m-bit data path can be increased than ever.

The second data conversion function processor of the present invention presumes having a n-bit data path and a m-bit data path and performing the process of a data conversion function in a non-uniform MISTY structure in which the two data paths are connected by zero-extend conversion or truncate conversion in each stage and the exclusive OR of a first (n+m)-bit data outputted from the data conversion function and a second (n+m)-bit data inputted from outside the data conversion function. In this case, m<n.

The first aspect of the second data conversion function processor includes a zero-extend conversion unit provided on a first route connecting between the two data paths, to zero-extend-convert m bits branched and inputted from the m-bit data path to n bits and a first exclusive OR calculator provided on the first route, to calculate the exclusive OR of n bits outputted from the zero-extend conversion unit and the n bits of the second (n+m) bits.

The first aspect of the second data conversion function processor is provided, for example, with an n-bit input/output non-linear converter Sn in the upper section of a connecting point of the first route and the m-bit data path.

The second aspect of the second data conversion function processor further includes a zero-extend conversion unit provided on a second route connecting between the two data paths, to zero-extend-convert m bits branched and inputted from an n-bit round key KIij2 and the m-bit data path to n-bits, a second exclusive OR calculator provided on a second route connecting between the two data paths, to calculate the exclusive OR of n bits outputted from the zero-extend conversion unit and an n-bit round key KIij2, a third exclusive OR calculator to calculate the exclusive OR of the lower-order m bits of an n-bit round key KIij2 and an m-bit round key KIij1 and a fourth exclusive OR calculator provided on the m-bit data path, to input m bits outputted from the third exclusive OR calculator in the above first aspect.

The second aspect of the second data conversion function processor is provided with, for example, an n-bit input/output non-linear converter Sn in the upper section of a connecting point between the second route and the n-bit data path.

The third aspect of the second data conversion function processor includes a first exclusive OR calculator provided on a route connecting between the two data paths, to calculate the exclusive OR of the m bits of the second (n+m) bits and m bits branched and inputted from the m-bit data path and a concatenate conversion unit to combine m bits outputted from the first exclusive OR calculator and the (n−m) bits of the second (n+m) bits by concatenate conversion to convert it to n bits and outputting the n-bits to the n-bit data path.

In the third aspect of the second data conversion function processor, for example, the branched and inputted m bits is the output of the second exclusive OR calculator, inputted by a round key KIij1 provided on the m-bit data path.

The fourth aspect of the second data conversion function processor includes a first exclusive OR calculator provided on the m-bit data path, to calculate the exclusive OR of the lower-order m bits of the second (n+m) bits and m bits inputted from the m-bit data path, a concatenate conversion unit to combine m bits inputted from a branch point provided in the lower section of the first exclusive OR calculator on the m-bit data path with the higher-order (n−m) bits of the second (n+m) bits by concatenate conversion to convert it to n bits and outputting the n bits to the n-bit data path and a second exclusive OR calculator to calculate the exclusive OR of m bits inputted from the lower section of the branching point on the m-bit data path and the lower-order m bits of the (n+m) bits.

The fifth aspect of the second data conversion function processor includes a first exclusive OR calculator provided on a first route connecting between the two data paths, to calculate the exclusive OR of m bits branching-point-inputted from the m-bit data path and the m bits of an n-bit round key KIij2, a concatenate conversion unit provided on the first route, to combine m bits outputted from the first exclusive OR calculator and the second (n−m) bits of the round key KIij2 by concatenate conversion to convert it to n-bits, a second exclusive OR calculator to calculate the exclusive OR of the lower-order m bits of the round key KIij2 and an m-bit round key KIij1, a third exclusive OR calculator provided on the m-bit data path, to calculate the exclusive OR of m bits outputted from the second exclusive OR calculator and m bits inputted from the m-bit data path, a zero-extend conversion unit provided on a second route connecting between the two data paths, to zero-extend-convert m bits branching-point-inputted from the m bit data path to n bits and a fourth exclusive OR calculator provided on the second route, to calculate the exclusive OR of n bits outputted from the zero-extend conversion unit and the higher-order n bits of the second (n+m) bits.

The sixth aspect of the second data conversion function processor includes a zero-extend conversion unit provided on a first route connecting between the two data paths, to zero-extend-convert m bits branching-point-inputted from the m-bit data path to n bits, a first exclusive OR calculator provided on the first route, to calculate the exclusive OR of n bits outputted from the zero-extend conversion unit and the n bits of the second (n+m) bits, a second exclusive OR calculator to calculate the exclusive OR of the lower-order m bits of the round key KIij2 and an m-bit round key KIij1, a third exclusive OR calculator provided on the m-bit data path, to calculate the exclusive OR of m bits outputted from the second exclusive OR calculator and m bits inputted from the m-bit data path, a fourth exclusive OR calculator provided on a second route connecting between the two data paths, to calculate the exclusive OR of m bits branching-point-inputted from the m-bit data path and the m bits of the second (n+m) bits and a concatenate conversion unit provided on the second route, to combine m bits outputted from the fourth exclusive OR calculator and the (n−m) bits of the first or second (n+m) bits by concatenate conversion to convert it to n bits.

In the above sixth aspect of the second data conversion function processor, for example, m bits inputted to the fourth exclusive OR calculator from the m-bit data path is the output of the third exclusive OR calculator.

The seventh aspect of the second data conversion function processor includes a first exclusive OR calculator provided on a first route connecting between the two data paths, to calculate the exclusive OR of m bits branched and inputted from the m-bit data path and the lower-order m bits of an n-bit round key KIij2, a first concatenate conversion unit to combine m bits outputted from the first exclusive OR calculator with the (n−m) bits of the round key KIij2 by concatenate conversion to convert it to n bits, a second exclusive OR calculator to calculate the exclusive OR of the lower-order m bits of the round key KIij2 and an m-bit round key KIij1, a third exclusive OR calculator provided on the m-bit data path to which m bits outputted from the second exclusive OR calculator are inputted, a fourth exclusive OR calculator provided on a second route connecting between the two data paths, to calculate the exclusive OR of the lower-order m bits of the first or second (n+m) bits and m bits branched and inputted from the m-bit data path and a second concatenate conversion unit provided on the second route, to combine m bits outputted from the fourth exclusive OR calculator and the higher-order (n−m) bits of the first or second (n+m) bits by concatenate conversion to convert it to n bits.

In the seventh aspect of the second data conversion function processor, for example, m bits branched and inputted to the fourth exclusive OR calculator from the m-bit data path is outputted from the third exclusive OR calculator. In such a configuration, for example, an n-bit input/output non-linear converter Sn is provided in the upper section of a connecting point between the first or second route and the n-bit data path.

According to the second data conversion function processor of the present invention, the circuit configuration of a device for performing the process of a data conversion function in a non-uniform MISTY structure which includes an n-bit data path and an m-bit data path and to which the two data paths are connected by zero-extend conversion or truncate conversion in each stage and a process composed the exclusive OR of first (n+m)-bit data outputted from the data conversion function and second (n+m)-bit data inputted from outside the data conversion function is modified to a configuration from which an exclusive OR calculator to which a round key KIij2 is inputted, conventionally arranged on a n-bit data path and an exclusive OR calculator to which the n bits of the second (n+m) bits is inputted are excluded from an n-bit data path. This modification is made in such a way as to ensure the logical equivalence of the entire function. Thus, in the data conversion function processor for performing the process of a data conversion function and the exclusive OR of the (n+m)-bit output of the data conversion function and an externally inputted (n+m) bits, the number of exclusive OR calculators arranged in the inside critical path (n-bit data path in this case) can be reduced compared with the conventional data conversion function processor. Therefore, the process speed of a data conversion function processor for performing the process of a data conversion function in a non-uniform MISTY structure which includes an n-bit data path and an m-bit data path and to which the two data paths are connected by zero-extend conversion or truncate conversion in each stage and the process of the exclusive OR of first (n+m)-bit data outputted from the data conversion function and second (n+m)-bit data inputted from outside the data conversion function can be increased.

The MISTY structure is one type of the Feistel structure.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a general basic configuration of a common key cryptography data conversion function processor.

FIG. 5A is a configuration of an FL function.

FIG. 6 illustrates how to implement a conventional FI function.

FIG. 7 illustrates a critical path in a configuration including an FI function and an exclusive OR positioned immediately below it in an FO function.

FIG. 8A explains how to shorten a critical path only in an FI function (No. 1).

FIG. 9A explains how to shorten a critical path in a configuration including an FI function and an exclusive OR positioned immediately below it in an FO function (No. 1).

FIG. 10 is a circuit configuration of an FI function in the first preferred embodiment of the present invention.

FIG. 11 is a circuit configuration of an FI function and an exclusive OR positioned immediately below it, in the second preferred of the present invention.

FIG. 13A is a circuit configuration of an FI function in the fourth preferred embodiment of the present invention.

FIG. 13C is a circuit configuration of the second variation of an FI function in the fourth preferred embodiment of the present invention.

FIG. 13D is a circuit configuration of the third variation of an FI function in the fourth preferred embodiment of the present invention.

FIG. 15A is a circuit configuration of an FI function and an exclusive OR positioned immediately below it, in the sixth preferred embodiment of the present invention.

FIG. 15B is a variation of a circuit configuration of an FI function and an exclusive OR positioned immediately below it, in the sixth preferred embodiment of the present invention.

FIG. 17 is a circuit configuration of an FI function and an exclusive OR positioned immediately below it, in the eighth preferred embodiment of the present invention.

FIG. 19 illustrates a second installation method of zero-extend conversion.

DESCRIPTION OF EMBODIMENTS

Preferred embodiments of the present invention will be explained with reference to accompanying drawings.

Although in the following preferred embodiments, the present invention is mainly applied to a MISTY1 FI function, the present invention is not limited to the FI function and can be also applied to an F function in a MISTY structure other than the FI function. The block length is not also limited to 64 bits. The bit lengths of a private key and an extended key are not also limited to this preferred embodiment.

Although the components in this preferred embodiment of the present invention are explained below using terms of an "exclusive OR", a "non-linear function S9" and a "non-linear function S7", these terms mean not only a calculation and functions of "exclusive OR" and "non-linear function" but also an "exclusive OR calculator" and a "non-linear converter" being hardware for realizing those functions. Therefore, the following preferred embodiments indicate not only the process algorithms of an FI function and an FO function-related processing circuit but also their hardware (processor).

[How to Shorten a Critical Path in which Only an FI Function is Focused]

Firstly, how to shorten a critical path in which only an FI function is focused will be explained.

Figure 2A:
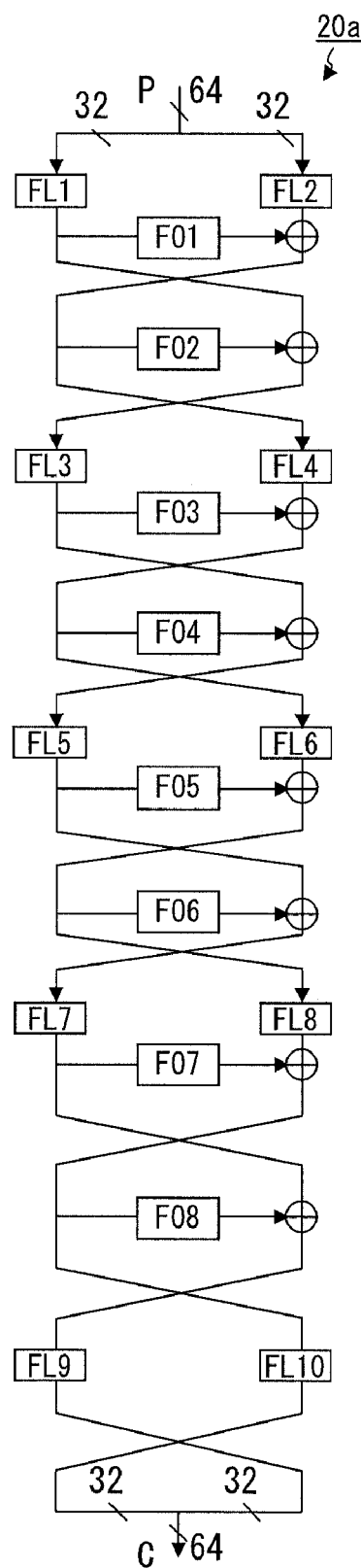
FIG. 2A is a configurations of a MISTY 1 round process unit for encryption.
Figure 2B:
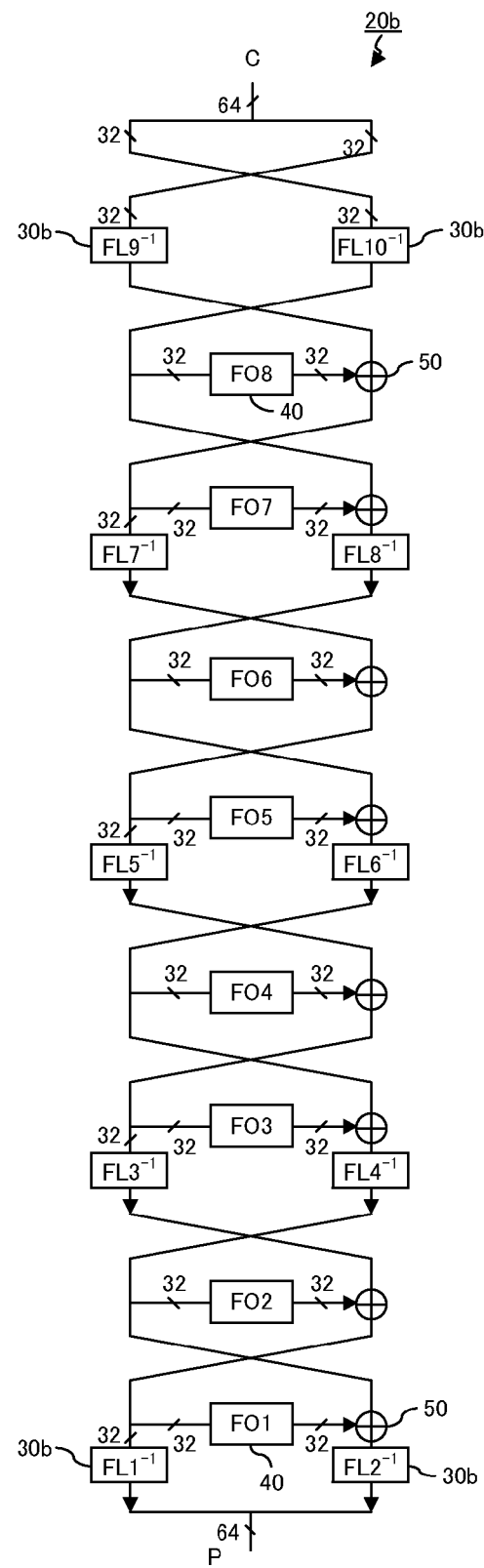
FIG. 2B is a configurations of a MISTY 1 round process unit for decryption.
Figure 3:
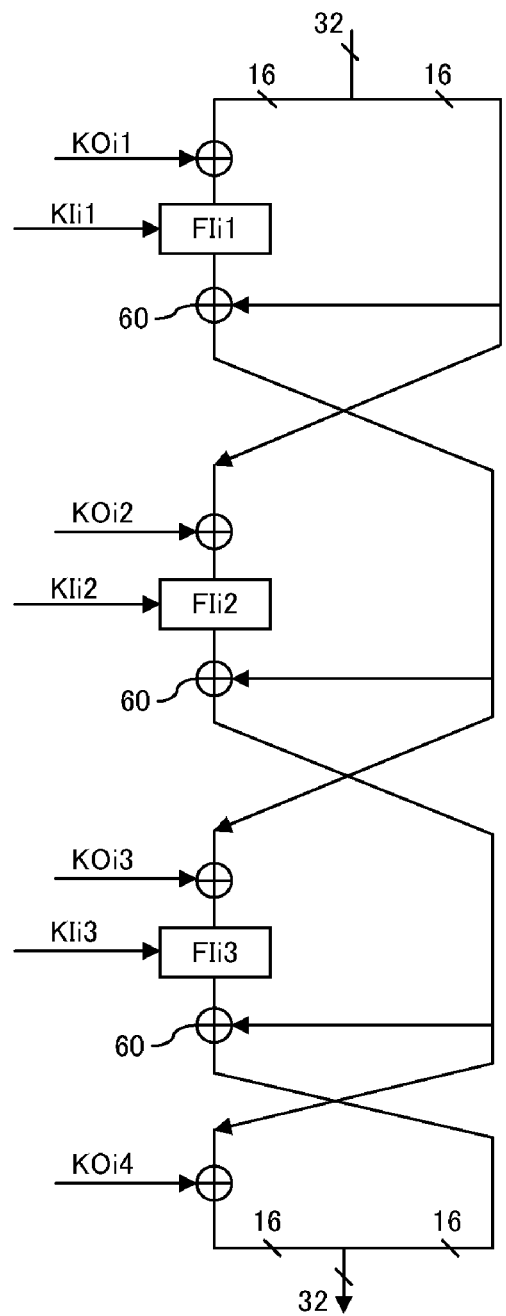
FIG. 3 is a configuration of an FO function.
Figure 4:
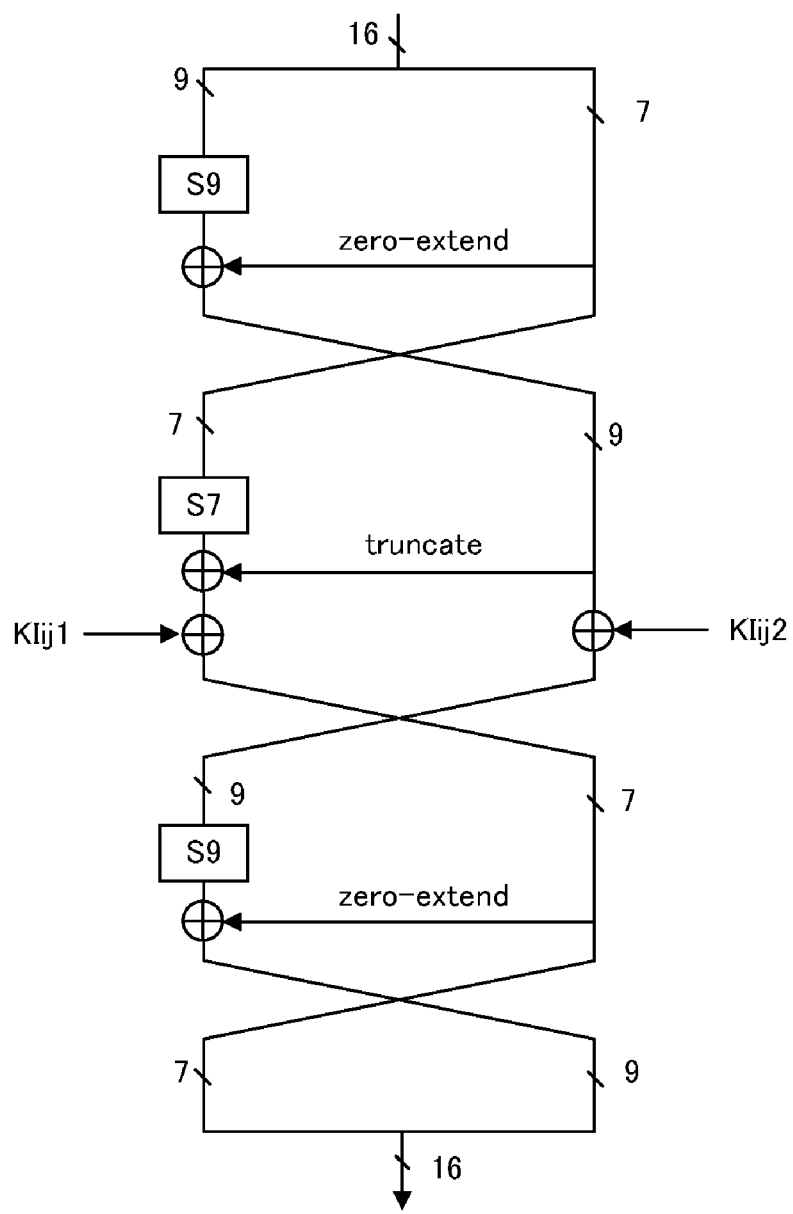
FIG. 4 is a configuration of an FI function.
Figure 5B:
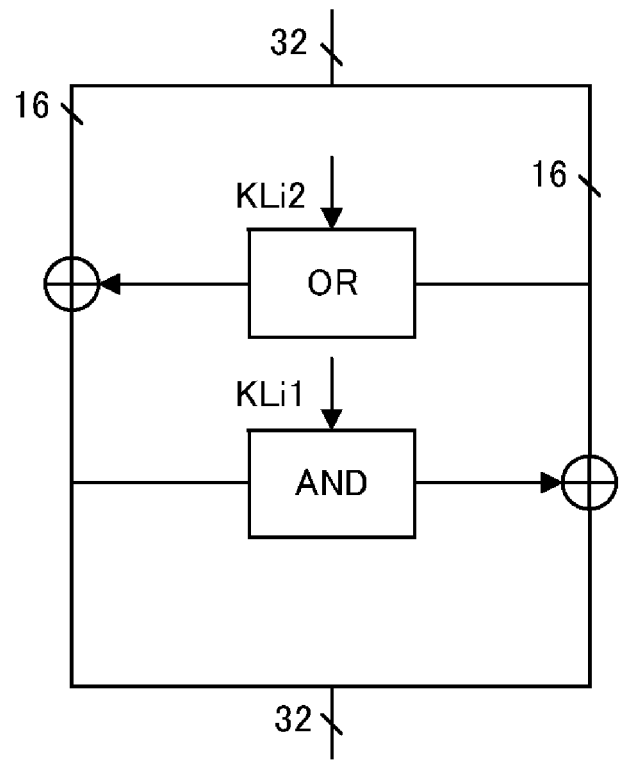
FIG. 5B is a configuration of an FL function.
Figure 8B:
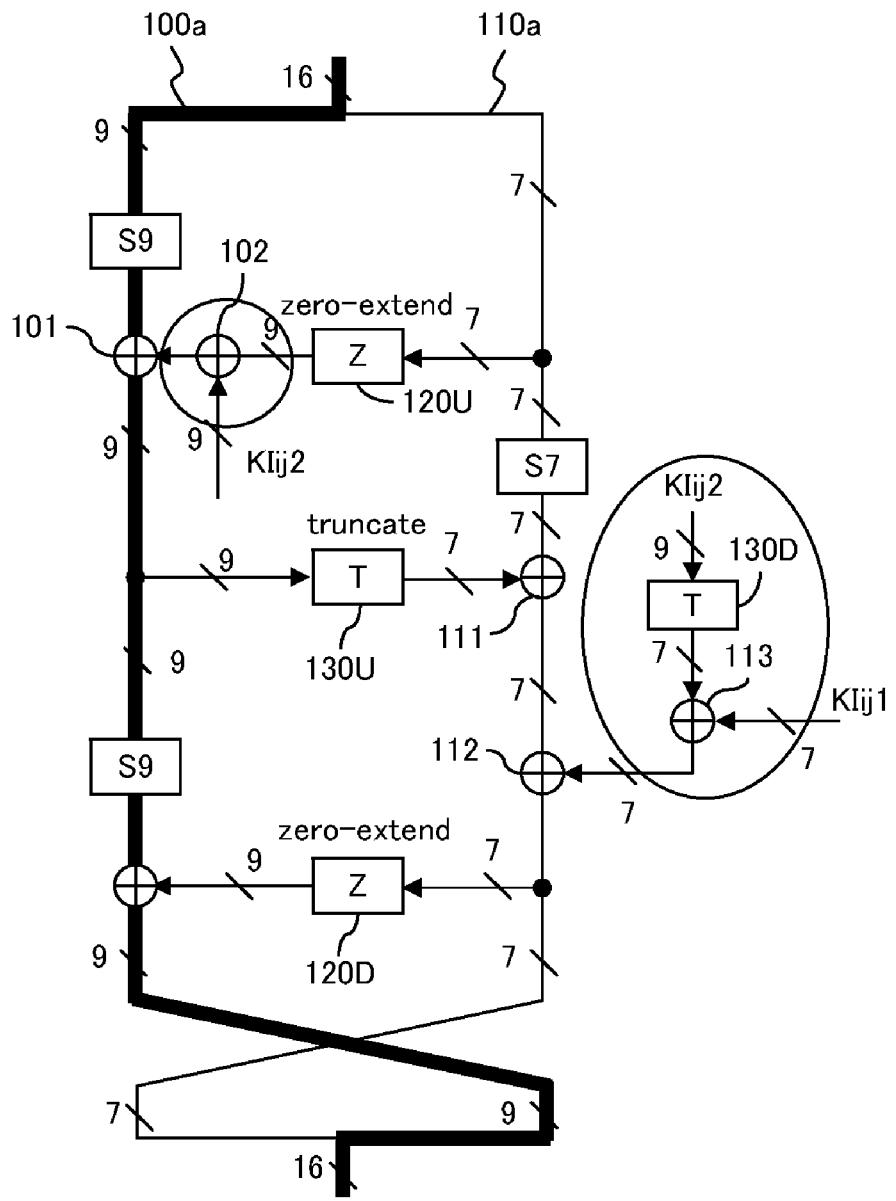
FIG. 8B explains how to shorten a critical path only in an FI function (No. 2).

FIGS. 8A and 8B explain how to shorten a critical path only in an FI function. FIG. 8A is the same as FIG. 6 and is a configuration of a conventional FI function.

In this method, firstly, in the FI function illustrated in FIG. 8A, an exclusive OR 102 positioned immediately before the second non-linear function S9 on the critical path 100 is moved to immediately after the first zero-extend conversion 120U (output destination) as illustrated in FIG. 8B. By this operation, the number of exclusive ORs on the critical path 100 decreases by one. A round key KIij2 is inputted to the moved exclusive OR 102 and by the position movement, the output of the exclusive OR 102 is inputted to an exclusive OR 111 arranged on a right system path 110a via an exclusive OR 101 and a truncate conversion 130U. As illustrated in FIG. 8A, the output before the movement of the exclusive OR 102 is not inputted to the right system path 110. Therefore, an operation to ensure the logical equivalence of the entire FI function becomes necessary.

As illustrated in FIG. 8B, this operation is performed by modifying the other input of an exclusive OR 112 which positioned immediately below the exclusive OR 111 on the path 110a and to which the output of the exclusive OR 111 is inputted. As illustrated in FIG. 8A, before the movement of the exclusive OR 102, the output of the exclusive OR 111 and the round key KIij1 are inputted to the exclusive OR 112. Then, as illustrated in FIG. 8B, the input of the round key KIij1 is replaced with the input of the calculation result of the exclusive OR of the round keys KIij1 and KIij2. In this case, since the round key KIij2 is nine bits, higher-order two bits of the round key KIij2 is omitted by the truncate conversion 130D and the lower-order seven bits of the round key KIij2 is inputted to an exclusive OR 113. The exclusive OR 113 calculates the exclusive OR of the lower-order seven bits of the round key KIij2 and the round key KIij1 and outputs the calculation result to the exclusive OR 112. As a result, since the exclusive OR 112 calculates the exclusive OR of the exclusive OR 111 and the round key KIij1, the logical equivalence of the entire FI function can be ensured. The arrangement position of the above exclusive OR 112 to which the calculation result of the exclusive OR of the lower-order seven bits of the round key KIij2 and the round key KIij1 is inputted from the exclusive OR 113 cannot also be the position illustrated in FIG. 8B and be between the non-linear function S7 on the data path 110a and the exclusive OR 111. In this case too, the logical equivalence of the entire FI function can be ensured.

As described above, since the FI function has a non-uniform structure, it is not easy to modify its circuit configuration while the logical equivalence is maintained. However, in this method, by omitting the higher-order two bits of the round key KIij2, the exclusive OR of the round key KIij2 can be calculated as to a path 110a with the different number of bits. In this case, even though the higher-order two bits are omitted, its logical equivalence is never destroyed. Hereinafter, the moving operation of the above-described exclusive OR 102 is called a "transform 1". This transform 1 is divided into two operations of moving the exclusive OR 102 to which the round key KIij2 is inputted, to the output destination of the zero-extend conversion 120U (hereinafter called a "transform 1A") and adding a circuit for generating seven bits to be inputted to the exclusive OR 112 (circuit including the truncate conversion 130D and the exclusive OR 113) (hereinafter called a "transform 1B").

[How to Shorten a Critical Path in which a Configuration Including an FI Function and an Exclusive or Positioned Immediately Below it is Focused, in an FO Function]

Next, how to shorten a critical path in which a configuration including an FI function and an exclusive OR positioned immediately below it is focused, in an FO function will be explained.

Figure 9B:
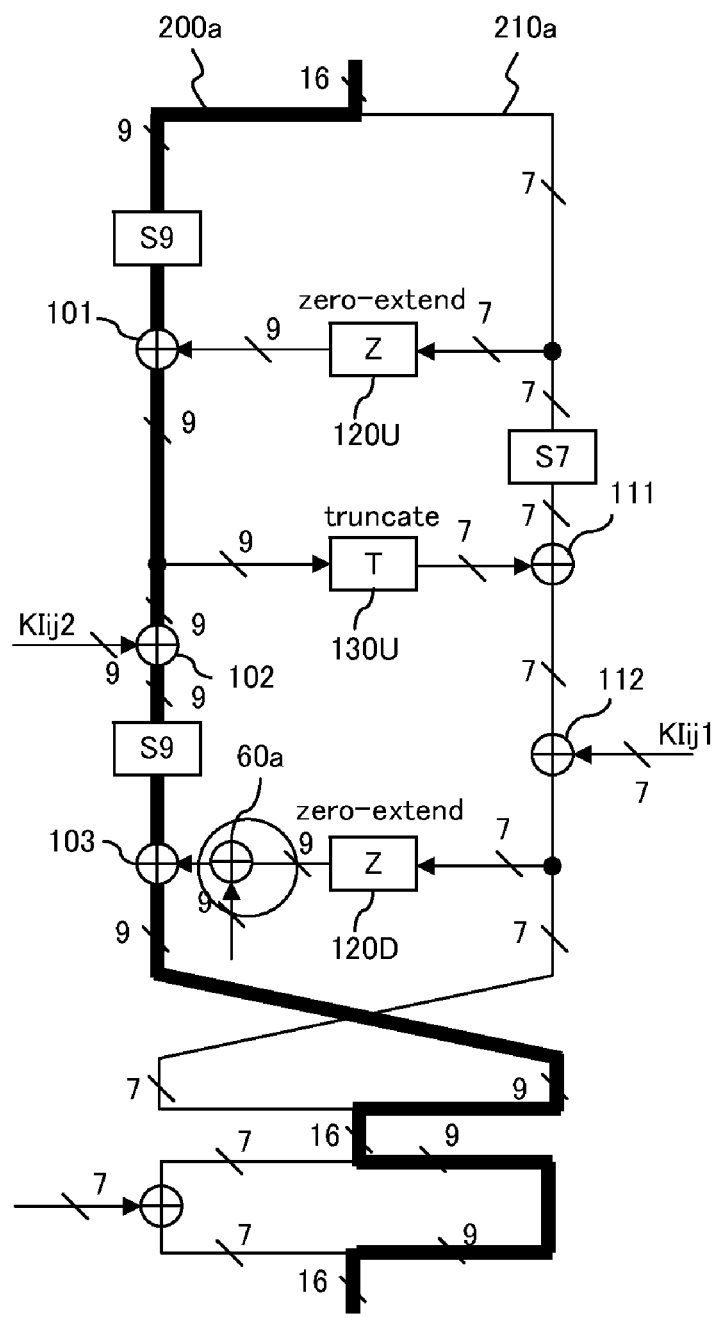
FIG. 9B explains how to shorten a critical path in a configuration including an FI function and an exclusive OR positioned immediately below it in an FO function (No. 2).

FIGS. 9A and 9B explain how to shorten a critical path in a configuration including an FI function and an exclusive OR positioned immediately below it in an FO function. FIG. 9A is the same as FIG. 7 and is a circuit configuration of a conventional FI function.

In this method, as illustrated in FIG. 9B, an exclusive OR 60a positioned immediately below an FI function existing on the critical path 200 of the FI function illustrated in FIG. 9A is moved to the position of the output destination of the zero-extend conversion 120D existing on a route connecting the path 210a and critical path 200a of the FI function. More particularly, the exclusive OR 60a is inserted in between the above zero-extend conversion 120D and the exclusive OR 103 positioned immediately below the second non-linear function S9 on the critical path 200a. By this operation, the number of exclusive ORs on the critical path 200 decreases by one, so the critical path 200 can be shortened. The output of the exclusive OR 60a is inputted to the critical path 200a. The exclusive OR 60a is originally arranged on the critical path 200a and the entire logical result does not change even if the process order of exclusive ORs changes. Therefore, even if the exclusive OR 60a is moves to the above position, the logical equivalence of the entire FI function can be ensured. Hereinafter, such a moving operation of an exclusive OR is called a "transform 2".

The following preferred embodiments of the present invention are methods for realizing the shortening of the "critical path of an FI function" and the "critical path of a configuration including an FI function and an exclusive OR positioned immediately below it, in an FO function" on the base of the above transforms 1 and 2.

First Embodiment

FIG. 10 is a circuit configuration of the FI function in the first preferred embodiment of the present invention.

The circuit of an FI function 300a illustrated in FIG. 10 can be obtained by applying the above transform 1 to the circuit of a conventional FI function illustrated in FIG. 6.

The circuit configuration of the FI function 300a will be explained in detail.

The critical path 100a of the FI function 300a includes two non-linear functions S9 and two exclusive ORs. 16-bit data inputted to the FI function 300a is separated into nine bits and seven bits. The nine bits and seven bits are inputted to the critical path 100a and to its right system path 110a, respectively. In the critical path 100a, a first non-linear function S9, an exclusive OR 101, a second non-linear function S9 and an exclusive OR 103 are arranged in that order from top. In the path 110a, a non-linear function S7, an exclusive OR 111, and an exclusive OR 112 are arranged in that order from top. The critical path 100a and the path 110a are jointed at their ends and the nine bits outputted from the critical path 100a and the seven bits outputted from the path 110a are combined into 16-bit data at the jointing point 311. In this combination, the outputs of the critical path 100a and the path 110a become its lower-order bits and higher-order bits, respectively.

The path 110a includes two branching points 301 and 303. The critical path 100a includes one branching point 302. The branching point 301 of the path 110a is provided in the upper section of the non-linear function S7. The seven bits inputted to the path 110a is inputted to the zero-extend conversion 120U (first zero-extend conversion) via the branching point 301. The zero-extend conversion 120U converts the seven-bit data to nine-bit data and outputs it to the exclusive OR 102. This exclusive OR 102 is provided between the exclusive OR 101 arranged on the critical path 100a and the zero-extend conversion 120U. The exclusive OR 102 calculates the exclusive OR of the 9-bit data inputted from the zero-extend conversion 120U and the round key KIij2 and outputs the calculation result to the exclusive OR 101. Thus, the zero-extend conversion 120U and the exclusive OR 102 are provided on a route connecting the path 110a and the critical path 100a.

The branching point 302 of the critical path 100a is provided immediately below the above exclusive OR 101 and the output (9-bit data) of the exclusive OR 101 is inputted to the truncate conversion 130U via the branching point 302. The truncate conversion 130U omits higher-order two bits from the 9-bit data outputted from the exclusive OR 101 to convert the output of exclusive OR 101 to 7-bit data. Then, the truncate conversion 130U outputs the 7-bit data to the exclusive OR 111 provided on the path 110a. Thus, the truncate conversion 130U is provided on a route connecting the critical path 100a and the path 110a.

The above exclusive OR 111 is provided immediately below the non-linear function S7 and calculates the exclusive OR of the output of the exclusive OR 111 and the output of the non-linear function S7. The output of the exclusive OR 111 is inputted to the exclusive OR 112 on the path 110a. The exclusive OR 112 calculates the exclusive OR of the output of the exclusive OR 111 and the output of the exclusive OR 113. The exclusive OR 113 is provided outside the path 110a and calculates the exclusive OR of the round key KIij1 and the output of the truncate conversion 130D. The truncate conversion 130D is provided outside the path 110a and converts the nine bits of the round key KIij2 to 7-bit data by omitting its higher-order two bits. Then, it outputs the 7-bit data to the exclusive OR 113.

The output of the exclusive OR 112 is inputted to the zero-extend conversion 120D provided on a route connecting the path 110a and the critical path 100a via the branching point 303 provided on the path 110a. The zero-extend conversion 120D converts the 7-bit data outputted from the exclusive OR 112 to 9-bit data and outputs the 9-bit data to the exclusive OR 103 provided on the critical path 100a. The exclusive OR 103 is provided immediately below the non-linear function S9 (second non-linear function S9) for non-linear-converting the output data of the exclusive OR 101. The exclusive OR 103 calculates the exclusive OR of the output of the non-linear function S9 and the output of the zero-extend conversion 120D and outputs the calculation result (9-bit data) to the above jointing point 311. The output (7-bit data) of the exclusive OR 112 on the path 110a is inputted to this jointing point 311.

The critical path 100a of the FI function 300a includes two non-linear functions S9 and two exclusive ORs 101 and 103, and the number of exclusive ORs is smaller than the that of the critical path 200 of the conventional FI function illustrated in FIG. 7 by two. Therefore, the FI function 300a in this preferred embodiment has a process speed higher than the conventional FI function.

Second Embodiment

FIG. 11 is a "circuit configuration of a configuration including an FI function and an exclusive OR positioned immediately below it, in an FO function" (hereinafter called a "circuit configuration of an FI function and an exclusive OR positioned immediately below it", in the second preferred embodiment of the present invention. In FIG. 11, the same reference numerals are attached to the same components as illustrated in FIG. 10.

The circuit configuration 400a of an FI function and an exclusive OR positioned immediately below it illustrated in FIG. 11 can be obtained by applying the above transform 2 to the conventional circuit configuration of an FI function and an exclusive OR positioned immediately below it illustrated in FIG. 7.

In the circuit configuration 400a of an FI function and an exclusive OR positioned immediately below it, a 9-bit critical path 201a and a 7-bit path 211a are added to the lower section of the above FI function 300a. In the critical path 201a of the circuit configuration 400a of an FI function and an exclusive OR positioned immediately below it, the above critical path 201a is added to the critical path 100a of the FI function 300a. In the path 210a of the circuit configuration 400a of an FI function and an exclusive OR positioned immediately below it, the above data path 211a is added to the path 110a of the FI function 300a. Next, the circuit configuration 400a of an FI function and an exclusive OR positioned immediately below it will be explained. Points different from the FI function 300a will be mainly described below in order to avoid duplications.

Only the zero-extend conversion 120U is provided on a route connecting between the exclusive OR 101 on the critical path 200a and the branching point 301 of a path 210a. The round key KIij1 is directly inputted to the exclusive OR 112 provided on the path 210a. An exclusive OR 60a is provided on a route connecting the exclusive OR 103 provided on the critical path 200a and the branching point 303 of the path 210a in addition to the zero-extend conversion 120D. 7-bit data outputted from the branching point 303 of the path 210a is inputted to the exclusive OR 60a after being converted to 9-bit data by the zero-extend conversion 120D. The exclusive OR 60a calculates the exclusive OR of the 9-bit data inputted from the zero-extend conversion 120D and the lower-order nine bits 191 (hereinafter called "9-bit data 191) of 16 bits outputted from the right system 16 bits of 32-bit data inputted to the FO function or the left system data path of an FI function in the previous stage, and outputs the calculation result to the exclusive OR 103 arranged on the critical path 200a. The exclusive OR 113 for calculating the exclusive OR of the higher-order seven bits of the above 16 bits and 7-bit data outputted from the exclusive OR 112 arranged on the path 110a of the FI function 300a is provided on the path 211a.

The critical path 200a of the circuit configuration 400a of an FI function and an exclusive OR positioned immediately below it includes two non-linear functions S9 and three exclusive ORs 101 through 103 and its number of exclusive ORs is smaller than that of the critical path 200 of the conventional circuit configuration of an FI function and an exclusive OR positioned immediately below it illustrated in FIG. 7 by one. Therefore, the circuit configuration 400a of an FI function and an exclusive OR positioned immediately below it in this preferred embodiment has a process speed higher than the conventional circuit configuration of an FI function and an exclusive OR positioned immediately below it.

Third Embodiment

Figure 12:
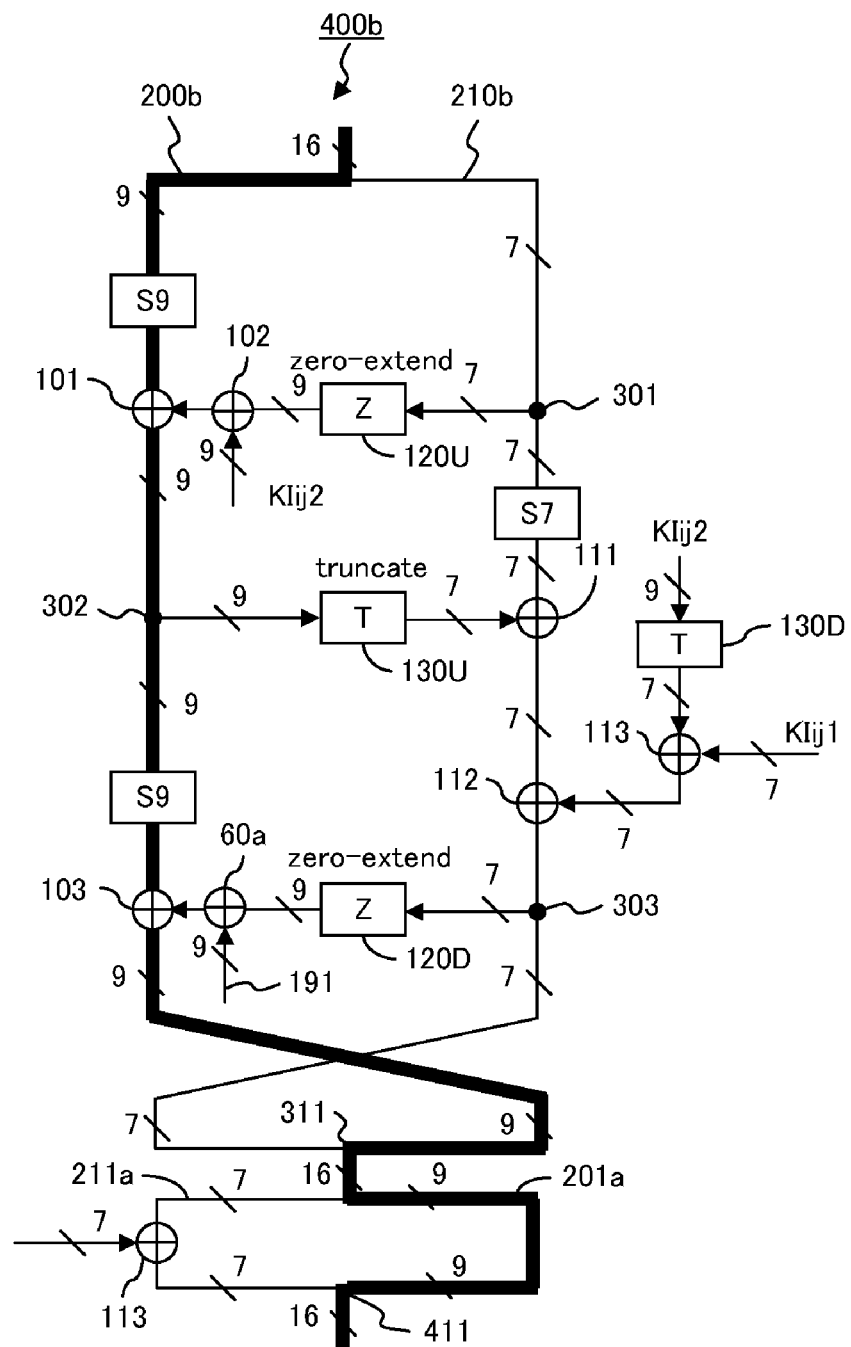
FIG. 12 is a circuit configuration of an FI function and an exclusive OR positioned immediately below it, in the third preferred embodiment of the present invention.

FIG. 12 is a circuit configuration of an FI function and an exclusive OR positioned immediately below it, in the third preferred embodiment of the present invention. In FIG. 12, the same reference numerals are attached to the same components as illustrated in FIGS. 10 and 11.

The circuit configuration 400b of an FI function and an exclusive OR positioned immediately below it illustrated in FIG. 12 can be obtained by applying the above transforms 1 and 2 to the conventional circuit configuration of an FI function and an exclusive OR positioned immediately below it illustrated in FIG. 7.

In the circuit configuration 400b of an FI function and an exclusive OR positioned immediately below it, the above transform 1 added to the circuit configuration 400a of an FI function and an exclusive OR positioned immediately below it illustrated in FIG. 11. The circuit configuration 400b of an FI function and an exclusive OR positioned immediately below it includes a left system data path 200b and a right system data path 210b and the data path 200b becomes a critical path. In the circuit configuration 400b of an FI function and an exclusive OR positioned immediately below it, the exclusive OR 102 existing on the critical path 200a of the circuit configuration 400a of an FI function and an exclusive OR positioned immediately below it is moved to on a route connecting the exclusive OR 101 on the critical path 200b and the branching point 301 on the path 210b by the above transform 1. More specifically, the exclusive OR 102 is arranged between the zero-extend conversion 120U and the exclusive OR 101. Following this arrangement, one of the inputs of the exclusive OR 112 arranged on the path 210b is modified from the round key KIij1 to the output of the exclusive OR 113 in order to maintain the logical equivalence of the entire circuit.

The critical path 200b of the circuit configuration 400b of an FI function and an exclusive OR positioned immediately below it includes two non-linear functions S9 and two exclusive ORs 101 and 103. Therefore, the number of exclusive ORs of the critical path 200b of the circuit configuration 400b of an FI function and an exclusive OR positioned immediately below it, in this preferred embodiment is smaller than that of the above critical path 200a of the circuit configuration 400a of an FI function and an exclusive OR positioned immediately below it, in the second preferred embodiment by one. Therefore, the circuit configuration 400b of an FI function and an exclusive OR positioned immediately below it in this preferred embodiment has a process speed higher than the circuit configuration 400a of an FI function and an exclusive OR positioned immediately below it.

Fourth Embodiment

FIG. 13A is a circuit configuration of an FI function in the fourth preferred embodiment of the present invention. In FIG. 13, the same reference numerals are attached to the same components as those of the circuit of the FI function 300a illustrated in FIG. 10.

In an FI function 300b1 illustrated in FIG. 13A, the zero-extend conversion 120U arranged in the upper section of the FI function 300a is replaced with a concatenate-conversion. Therefore, Its right and left system paths (data paths) are those of the FI function 300a. The concatenate-conversion bit-connects a 2-bit input to the higher-order of a 7-bit input and outputs the nine bits obtained by the bit combination. In the FI function 300b1, the zero-extend conversion 120 U of the FI function 300a and the exclusive OR 102 being its output destination are replaced with a concatenate conversion 140U and an exclusive OR 151U.

A circuit enclosed with a broken-line rectangular frame 310U (hereinafter called a "replacement circuit 310U") in FIG. 13A is the replacement circuit of the zero-extend conversion 120U. The configuration of this replacement circuit 310U will be explained in detail below.

The replacement circuit 310U includes the concatenate conversion 140U and the exclusive OR 151. The exclusive OR 151 inputs seven bits (seven bits of 16-bit input data of an FI function 300b1) from the branching point 301 of the path 110a and the lower-order seven bits of the round key KIij2, and calculates the exclusive OR of those two input bits. The exclusive OR 151U outputs the logical calculation result to the concatenate conversion 140U. The concatenate conversion 140U also inputs the higher-order two bits of the round key KIij2. The concatenate conversion 140U combines the seven bits inputted from the exclusive OR 151U with the higher-order two bits of the round key KIij2 and outputs the nine bits obtained by the bit combination to the exclusive OR 101 arranged on the critical path 200a.

In the FI function 300b1, the exclusive OR 102 for performing a 9-bit exclusive OR, of the FI function 300a is replaced with the exclusive OR 151U for performing a 7-bit exclusive OR. Therefore, the circuit scale necessary for an exclusive OR calculation, of the FI function 300b1 can be made less than that of the FI function 300a. Therefore, the scale of the entire circuit can be made less than that of the FI function 300a.

First Variation of Fourth Embodiment

Figure 13B:
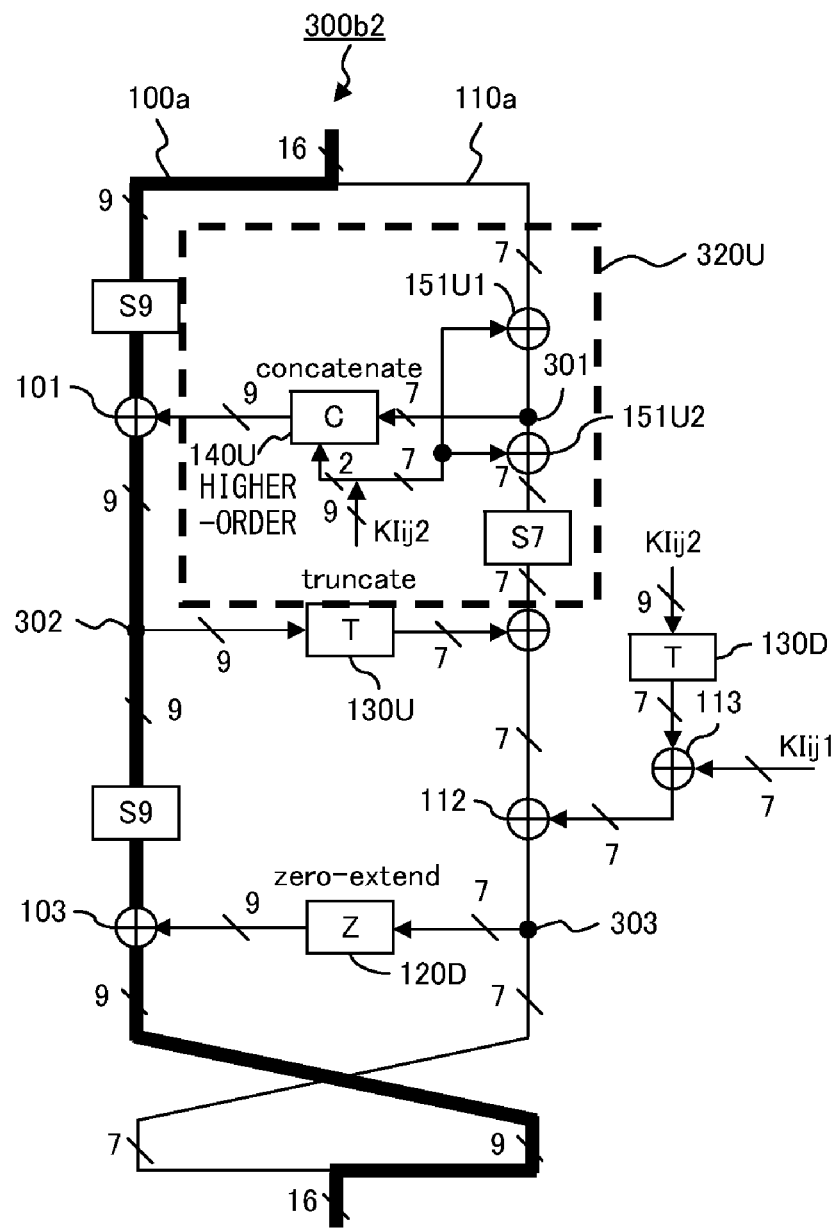
FIG. 13B is a circuit configuration of the first variation of an FI function in the fourth preferred embodiment of the present invention.

FIG. 13B is a circuit configuration of the first variation of the above described FI function 300b1. In FIG. 13B, the same reference numerals are attached to the same components as those of the circuit of the FI function 300b1 illustrated in FIG. 13A.

In an FI function 300b2 illustrated in FIG. 13B, the replacement circuit 310U of the FI function 300b1 is replaced with a replacement circuit 320U enclosed with a broken-line rectangular frame in FIG. 13B. In the replacement circuit 320U, the exclusive OR 151U in the replacement circuit 310U is replaced with two exclusive ORs 151U1 and 151U2. The exclusive OR 151U1 is arranged immediately before the branching point 301 on the path 110a and inputs the right seven bits of the 16-bit input data of the FI function 300b2 and the lower-order seven bits of the round key KIij2. The exclusive OR 151U2 is provided immediately after the branching point 301 on the path 110a and inputs the logical calculation result of the exclusive OR 151U1 and the lower-order seven bits of the round key KIij2. The logical calculation result of the exclusive OR 151U2 is outputted to the non-linear function S7 arranged on the path 110a.

Second Variation of Fourth Embodiment

FIG. 13C is a circuit configuration of the second variation of the above-described FI function 300b1. In FIG. 13C, the same reference numerals are attached to the same components as those of the circuit of the FI function 300b1 illustrated in FIG. 13A.

In an FI function 300b3 illustrated in FIG. 13C, the partial circuit enclosed with the rectangular frame 401 of the FI function 300b1 (hereinafter called a "replacement circuit 401") illustrated in FIG. 13A is replaced with a circuit enclosed with a rectangular frame 401a (hereinafter called a "replacement circuit 401a") and a circuit enclosed with a rectangular frame 401b (hereinafter called a "replacement circuit 401b").

In the replacement circuit 401a, the exclusive OR 112 to which the round key KIij1 is inputted is arranged on the path 110a and is the same as the circuit of the conventional FI function illustrated in FIG. 8A. The replacement circuit 401b includes a truncate conversion 130a and an exclusive OR 411. The exclusive OR 411 is provided between the exclusive OR 111 arranged on the path 110a and the truncate conversion 130D to which nine bits are inputted from the branching point 302 on the critical path 100a and inputs seven bits outputted from the truncate conversion 130U. The truncate conversion 130a converts a 9-bit round key KIij2 to seven bits and outputs the seven bits to the exclusive OR 411. The exclusive OR 411 calculates the exclusive OR of the seven bits inputted from the truncate conversion 130U and the seven bits inputted from the truncate conversion 130a and outputs the calculation result to the exclusive OR 111.

Third Variation of Fourth Embodiment

FIG. 13D is a circuit configuration of the third variation of the above FI function 300b1. In FIG. 13D, the same reference numerals are attached to the same components as those of the circuit of the FI function 300b1 illustrated in FIG. 13A.

In an FI function 300b4 illustrated in FIG. 13D, the partial circuit enclosed with the rectangular frame 401 of the FI function 300b1 (hereinafter called a "replacement circuit 401") illustrated in FIG. 13A is replaced with a circuit enclosed with a rectangular frame 402 (hereinafter called a "replacement circuit 402"). Although the left system path 100b of the FI function 300b4 is the same as that of the FI function 300b1, the right system path 100b somewhat differs from that of the FI function 300b1. More specifically, the arrangement position on the right system path of the exclusive OR 112 differs. In the FI function 300b4, the exclusive OR 112 is arranged immediately below the branching point 303 of the path 110b.

The replacement circuit 402 includes the truncate conversion 130D and three exclusive ORs 112, 113 and 413. The truncate conversion 130D and two exclusive ORs 112 and 113 are arranged in the same way as those of the FI function 300b1. The exclusive OR 413 is provided between the branching point 303 of the path 110b and the zero-extend conversion 120D. The exclusive OR 413 calculates the exclusive OR of seven bits inputted from the branching point 303 and seven bits inputted from the exclusive OR 113 and outputs the calculation result to the zero-extend conversion 120D.

Fifth Embodiment

Figure 14:
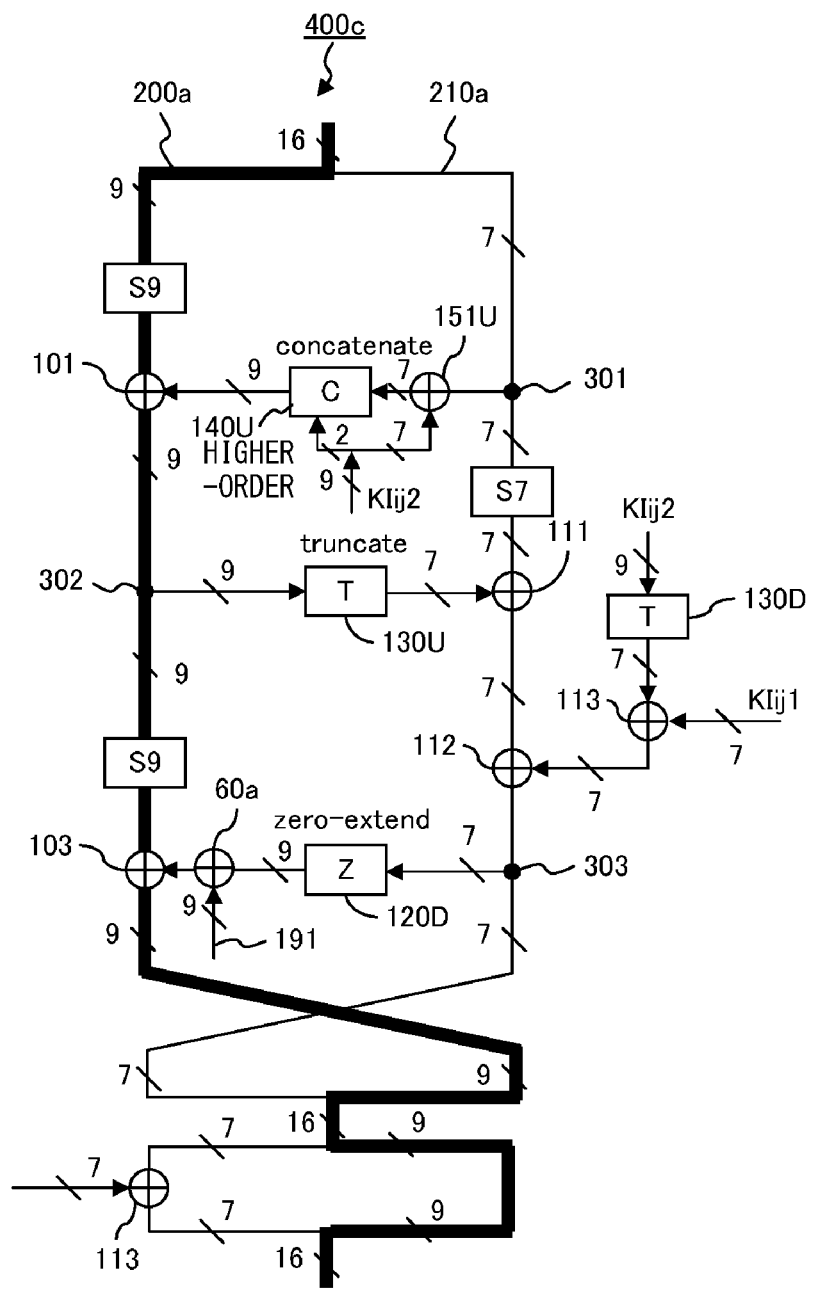
FIG. 14 is a circuit configuration of an FI function and an exclusive OR positioned immediately below it, in the fifth preferred embodiment of the present invention.

FIG. 14 is a circuit configuration of an FI function and an exclusive OR positioned immediately below it, being the fifth preferred embodiment of the present invention. In FIG. 14, the same reference numerals are attached to the same components as those of the circuit configuration 400b of an FI function and an exclusive OR positioned immediately below it, illustrated in FIG. 12.

The circuit configuration 400c of an FI function and an exclusive OR positioned immediately below it, illustrated in FIG. 14 is obtained by replacing the zero-extend conversion 120U provided in the upper section of the circuit configuration 400b of an FI function and an exclusive OR positioned immediately below it with a concatenate conversion. In the circuit configuration 400c of an FI function and an exclusive OR positioned immediately below it, the zero-extend conversion 120U and the exclusive OR 102 of the circuit configuration 300a of an FI function and an exclusive OR positioned immediately below it are replaced with the concatenate conversion 140U and the exclusive OR 151U.

In the circuit configuration 400c of an FI function and an exclusive OR positioned immediately below it, the exclusive OR 102 for performing a 9-bit exclusive OR calculation of the circuit configuration 400b of an FI function and an exclusive OR positioned immediately below it is replaced with the exclusive OR 151U for performing a 7-bit exclusive OR calculation. Therefore, the circuit scale necessary for an exclusive OR calculation of the circuit configuration 400c of an FI function and an exclusive OR positioned immediately below it can be made less than that of the circuit configuration 400b of an FI function and an exclusive OR positioned immediately below it.

Sixth Embodiment

FIG. 15A is a circuit configuration of an FI function and an exclusive OR positioned immediately below it, being the sixth preferred embodiment of the present invention. In FIG. 15A, the same reference numerals are attached to the same components as those of the circuit configuration 400a of an FI function and an exclusive OR positioned immediately below it, illustrated in FIG. 11.

The circuit configuration 400d1 of an FI function and an exclusive OR positioned immediately below it, illustrated in FIG. 15A is obtained by replacing the zero-extend conversion 120D provided in the lower section of he circuit configuration 400a of an FI function and an exclusive OR positioned immediately below it with a concatenate conversion. In the circuit configuration 400d1 of an FI function and an exclusive OR positioned immediately below it, the zero-extend conversion 120D and the exclusive OR 60a of the circuit configuration 400a of an FI function and an exclusive OR positioned immediately below it are replaced with the concatenate conversion 140D and the exclusive OR 151D.

A partial circuit enclosed with a rectangular frame 501 (hereinafter called a "replacement circuit 501") illustrated in FIG. 15A is a circuit obtained by applying the above replacement to the circuit configuration 400a of an FI function and an exclusive OR positioned immediately below it.

In the replacement circuit 501, the exclusive OR 151D and the concatenate conversion 140D are arranged between the branching point 303 of the path 210a and the exclusive OR 103 provided on the critical path 200a. The exclusive OR 151D inputs seven bits (seven bits of the output data of the exclusive OR 112) from the branching point 303 of the path 210a and also inputs the lower-order seven bits of the above 9-bit data 191 inputted to the exclusive OR 60a. The exclusive OR 151D calculates the exclusive OR of those two seven bits and outputs the calculation result to the concatenate conversion 140D. The concatenate conversion 140D combines seven bits inputted from the exclusive OR 151D and the higher-order two bits of the above 9-bit data 191 and outputs the combination result to the exclusive OR 103 arranged on the critical path 200a.

In the circuit configuration 400d1 of an FI function and an exclusive OR positioned immediately below it, the exclusive OR 60a for performing a 9-bit exclusive OR calculation, of the circuit configuration 400a a of an FI function and an exclusive OR positioned immediately below it is replaced with the exclusive OR 151D for performing a 7-bit exclusive OR calculation. Therefore, the circuit scale necessary for an exclusive OR calculation of the circuit configuration 400c of an FI function and an exclusive OR positioned immediately below it can be made less than that of the circuit configuration 400a of an FI function and an exclusive OR positioned immediately below it.

Variation of Sixth Embodiment

FIG. 15B is a variation of the above circuit configuration 400d1 of an FI function and an exclusive OR positioned immediately below it. In FIG. 15B, the same reference numerals are attached to the same components as those of the circuit configuration 400d1 of an FI function and an exclusive OR positioned immediately below it, illustrated in FIG. 15A.

In the circuit configuration 400d2 of an FI function and an exclusive OR positioned immediately below it, illustrated in FIG. 15B, the exclusive OR 151D of the circuit configuration 400d1 of an FI function and an exclusive OR positioned immediately below it is replaced with two exclusive ORs 601 and 602. The exclusive OR 601 is provided between the exclusive ORs 111 and 112 on the path 210a. The exclusive OR 601 inputs the output of the exclusive OR 111 and the lower-order seven bits of the above 9-bit data 191, and calculates the exclusive OR of those two seven bits. Then, it outputs the logical calculation result to the exclusive OR 112. The exclusive OR 602 is provided immediately below the branching point 303 of the path 210a. The exclusive OR 602 inputs the output of the exclusive OR 112 and the lower-order seven bits of the above 9-bit data, and calculates the exclusive OR of those two seven bits. Then, the exclusive OR 602 outputs the calculation result to the path 110a.

Seventh Embodiment

Figure 16:
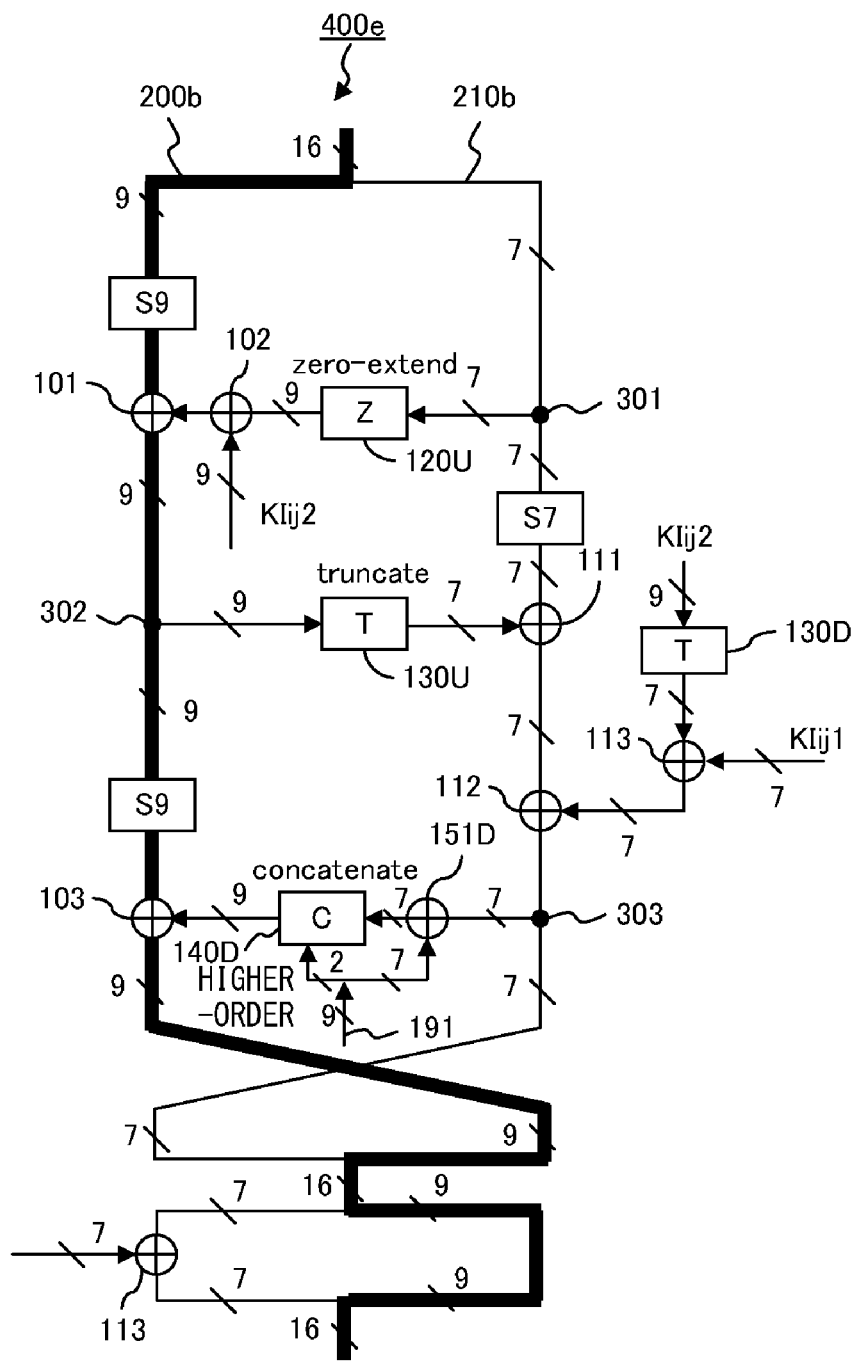
FIG. 16 is a circuit configuration of an FI function and an exclusive OR positioned immediately below it, in the seventh preferred embodiment of the present invention.

FIG. 16 is a circuit configuration of an FI function and an exclusive OR positioned immediately below it, being the seventh preferred embodiment of the present invention. In FIG. 16, the same reference numerals are attached to the same components as those of the circuit configuration of an FI function and an exclusive OR positioned immediately below it, illustrated in FIG. 12 and those of the circuit configuration 400d1 of an FI function and an exclusive OR positioned immediately below it, illustrated in FIG. 15A.

The circuit configuration 400e of an FI function and an exclusive OR positioned immediately below it, illustrated in FIG. 16 is obtained by replacing the zero-extend conversion 120D in the lower section and the exclusive OR 60a with the concatenate conversion 140D and the exclusive OR 151D in the circuit configuration 400b of an FI function and an exclusive OR positioned immediately below it, illustrated in FIG. 12 by the same method as that of the circuit configuration 400d1 of an FI function and an exclusive OR positioned immediately below it, illustrated in FIG. 15A. Since the concatenate conversion 140D and the exclusive OR 151D of the circuit configuration 400e of an FI function and an exclusive OR positioned immediately below it perform a 7-bit exclusive OR calculation, their circuits scale are smaller than that of the exclusive OR 60a of the circuit configuration 400b of an FI function and an exclusive OR positioned immediately below it. Therefore, the circuit scale of the circuit configuration 400e of an FI function and an exclusive OR positioned immediately below it can be made less than that of the circuit configuration 400b of an FI function and an exclusive OR positioned immediately below it.

Eighth Embodiment

FIG. 17 is a circuit configuration of an FI function and an exclusive OR positioned immediately below it, being the eighth preferred embodiment of the present invention. In FIG. 17, the same reference numerals are attached to the same components as those of the circuit configuration 400c of an FI function and an exclusive OR positioned immediately below it, illustrated in FIG. 14A and those of the circuit configuration 400d1 of an FI function and an exclusive OR positioned immediately below it, illustrated in FIG. 15A.

The circuit configuration 400f of an FI function and an exclusive OR positioned immediately below it, illustrated in FIG. 17 is obtained by replacing the zero-extend conversion 120D provided in the lower section of the circuit configuration 400c of an FI function and an exclusive OR positioned immediately below it and the exclusive OR 60a with the concatenate conversion 140D and the exclusive OR 151D by the same method as that of the circuit configuration 400d1 of an FI function and an exclusive OR positioned immediately below it, illustrated in FIG. 15A.

The circuit scale of the circuit configuration 400f of an FI function and an exclusive OR positioned immediately below it can be made less than that of those of the circuit configurations 400c, 400d1 and 400e illustrated in FIGS. 14A through 16.

Figure 18:
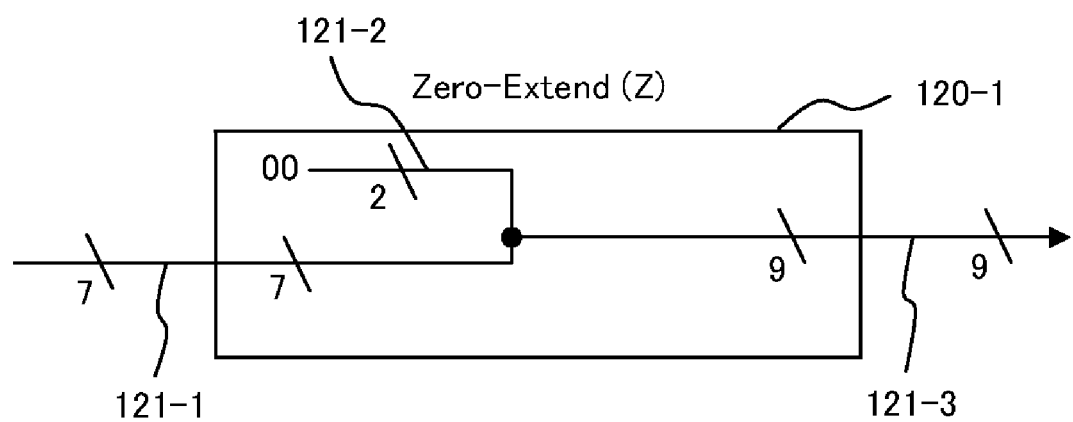
FIG. 18 illustrates a first installation method of zero-extend conversion.

[Installation Method of Zero-Extend Conversion]
{First Installation Method}
FIG. 18 is a first installation method of zero-extend conversion.

The zero-extend converter 120-1 illustrated in FIG. 18 inputs 7-bit data from a signal wire 121-1. The signal wire 121-1 is connected to a signal wire 121-2 to which two bits "00" is inputted. Then, the 7-bit data inputted from the signal wire 121-1 and the two bits "00" inputted from the signal wire 121-1 are combined in the jointing part. In this case, a 9-bit data whose lower-order and higher-order are 7-bit data and two bits "00", respectively, is generated. This 9-bit data is outputted from a signal wire 121-3 obtained by jointing the signal wires 121-1 and 121-2.

{Second Installation Method}
FIGS. 19A-19C illustrate a second installation method of zero-extend conversion.

Zero-extend conversion can also be realized by applying an exclusive OR only to the lower-order seven bits of a 9-bit signal in an exclusive OR calculator provided at the branching point of a 9-bit signal wire (path).

FIG. 19A illustrates apart including the zero-extend conversion 120D provided in the lower section of the FI function 300a illustrated in FIG. 10 and the exclusive OR 103 provided on the critical path 100a to which a 9-bit signal (9-bit data) outputted from the zero-extend conversion 120D is inputted. The circuit illustrated in FIG. 19A can be mounted by a circuit illustrated in FIG. 19B. In the circuit illustrated in FIG. 19B, a 7-bit signal wire 311 is connected to the exclusive OR 103 arranged on the critical path 100a. The input terminal of this signal wire 311 is connected to the branching point of the path 110a and inputs the lower-order seven bits of 16-bit signal (16-bit data) inputted to the FI function 300a to the exclusive OR 101.

FIG. 19C is the enlarged view of a part enclosed with a thick circle in FIG. 19B. As illustrated in FIG. 19C, the exclusive OR 103 is configured in such a way as to calculate the exclusive OR of the 7-bit signal (7-bit data) inputted via the signal wire 311 and the lower-order seven bits of the 9-bit signal (9-bit data) inputted via the critical path 100a. Specifically, an exclusive OR 301 calculates the exclusive OR of the lower-order seven bits of the 9-bit signal inputted from the critical path 100a and the seven bits inputted from the signal wire 311. Thus, by configuring the exclusive OR 103 as illustrated in FIG. 19C, a zero-extend conversion function can be provided for the exclusive OR 103 and a special circuit for the zero-extend conversion 120D can be omitted.

[Installation Method of Truncate Conversion]

{First Installation Method}

Figure 20:
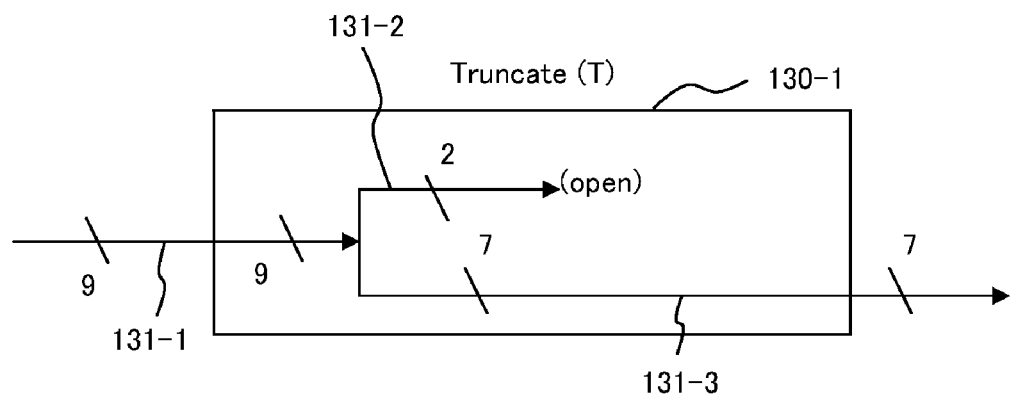
FIG. 20 illustrates a first installation method of truncate conversion.

FIG. 20 illustrates a first installation method of truncate conversion.

A truncate converter 130-1 illustrated in FIG. 20 inputs 9-bit data from a signal wire 131-1. The signal wire 131-1 is connected to signal wires 131-2 and 131-3, and the higher-order two bits of the above 9-bit data is outputted to the signal 131-2 and becomes open. However, the lower-order seven bits of the above 9-bit data is outputted to outside via the signal wire 131-3.

{Second Installation Method}

Figure 21:
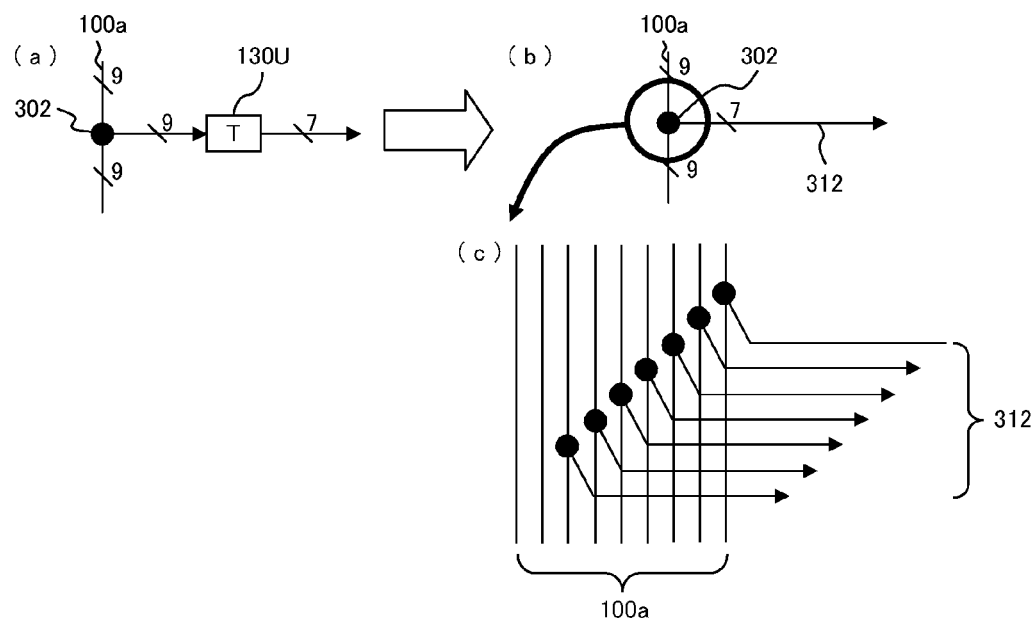
FIG. 21 illustrates a second installation method of truncate conversion.

FIGS. 21A-21C illustrate a second installation method of truncate conversion.

FIG. 21A illustrates a part including the branching point 302 on the critical path 100a and the truncate conversion 130U connected to the branching point 302, which are provided in the FI function 300a illustrated in FIG. 10. The circuit illustrated in FIG. 21A can be mounted by a circuit illustrated in FIG. 21B. In this circuit, a 7-bit signal wire 312 is branched from the critical path 100a at the branching point 302. FIG. 21C is the enlarged view of the branching point 302. As illustrated in FIG. 21C, of a 9-bit signal (9-bit data) inputted to the branching point 302 via the critical path 100a, the lower-order 7-bit signal in inputted to the signal wire 312. Thus, truncate conversion of converting nine bits to seven bits can be realized at the branching point 302 by devising the connection between the 9-bit signal wire (critical path 100a) and the signal wire 312.

[Installation Method of Concatenate Conversion]

Figure 22:
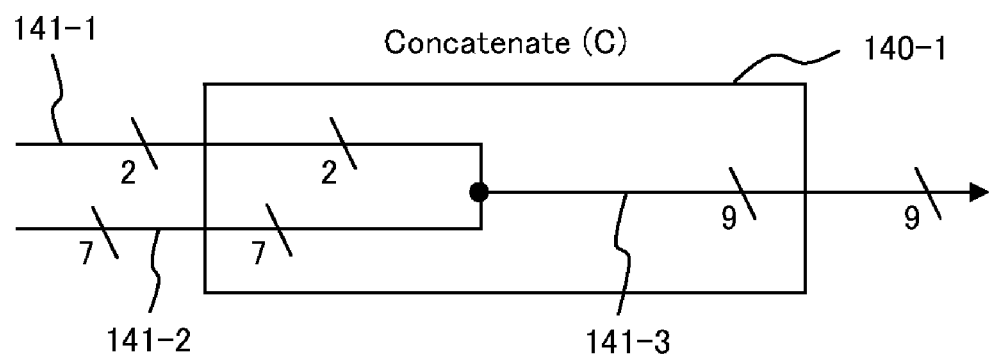
FIG. 22 illustrates an installation method of concatenate conversion.

FIG. 22 illustrates an installation method of concatenate conversion.

A concatenate converter 140-1 illustrated in FIG. 22 inputs two pieces of data of two bits and seven bits from signal wires 141-1 and 141-2, respectively. The signal wires 141-1 and 141-2 are connected to a 9-bit signal wire 141-3 inside the concatenate converter 140-1. Therefore, the above 2-bit data and 7-bit data is converted to 9-bit data whose higher-order two and lower-order seven bits are the 2-bit data and 7-bit data, respectively, at the above connecting point, which is outputted to outside via the signal wire 141-3.

According to the preferred embodiments of the present invention, the number of exclusive ORs existing on the critical path of the circuit configuration of a MISTY 1 FI function or an FI function and an exclusive OR positioned immediately below it can be reduced than ever. Therefore, when the circuit configuration of an FI function or an FI function and an exclusive OR positioned immediately below it in the preferred embodiment of the present invention is installed by hardware, its process speed can be made higher than the conventional configuration of an FI function or an FI function and an exclusive OR positioned immediately below it.

For example, the critical path 100a of the FI function 300a in the first preferred embodiment of the present invention includes two non-linear functions S9 and two exclusive ORs. However, the critical path of the conventional FI function includes two non-linear functions S9 and four exclusive ORs. Therefore, when both are installed by hardware, the numbers of calculators existing on the respective critical paths become as follows.

Circuit of FI function in First Embodiment: S9 converters=two, exclusive OR calculators=two Circuit of conventional FI function: S9 converters=two, exclusive OR calculators=four In this case it is assumed that gate delay per S9 converter and gate delay per exclusive OR calculator are x[s] and y[s], respectively. When the wiring delay of a circuit is neglected, the delay ratio R of the circuit of the FI function in the first preferred embodiment to the circuit of the conventional FI function becomes as follows.

$$R = \frac{2x+4y}{2x+2y} = \frac{x+2y}{x+y} \qquad \text{[Expression 1]}$$

If in the above expression it is assumed that $x[s]=70*10^{-9}$ and $y[s]=10*10^{-9}$, $R=1.125$.

Specifically, the process speed of the circuit of the FI function 300a in the first preferred embodiment of the present invention can be increased 12.5% compared with the circuit of the conventional FI function.

The present invention is not limited to the above-described preferred embodiments and can be variously changed, substituted and altered without departing from the spirit and scope of the invention. For example, although the above preferred embodiments are obtained by applying the present invention to MISTY 1, the present invention is not limited to MISTY 1. The present invention is also applicable to all the encryption algorithms in a MISTY structure, such as MISTY 2, KASUMI and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data conversion function processor for performing a process of a data conversion function in a non-uniform MISTY structure which includes an n-bit data path and an m (m<n)-bit data path and to which the two data paths are connected by zero-extend conversion or truncate conversion in each stage, comprising:
   a zero-extend conversion unit provided on a route connecting between the two data paths, to convert m bits branched and inputted from the data path of the m bits to n bits by zero-extend conversion;
   a first exclusive OR calculator provided on a route connecting between the two data paths, to calculate an exclusive OR of n bits outputted from the zero-extend conversion unit and an n-bit round key KIij2;

a second exclusive OR calculator to calculate an exclusive OR of lower-order m bits of the round key KIij2 and an m-bit round key KIij1; and a third exclusive OR calculator provided on the m-bit data path, to calculate an exclusive OR of m bits outputted from the second exclusive OR calculator and m bits inputted from the m-bit data path.

2. A data conversion function processor for performing a process of a data conversion function in a non-uniform MISTY structure which includes an n-bit data path and an m (m<n)-bit data path and to which the two data paths are connected by zero-extend conversion or truncate conversion in each stage, comprising:

a first exclusive OR calculator provided on a route connecting between the two data paths, to calculate an exclusive OR of m bits branched and inputted from the m-bit data path and lower-order m bits of a n-bit round key KIij2;

a concatenate conversion unit provided on a route connecting between the two data paths, to combine m bits outputted from the first exclusive OR calculator with (n−m) bits of the round key KIij2 by concatenate conversion to convert it to n bits;

a second exclusive OR calculator to calculate an exclusive OR of lower m bits of the round key KIij2 and an m-bit round key KIij1; and a third exclusive OR calculator provided on the m-bit data path, to calculate an exclusive OR of m bits outputted from the second exclusive OR calculator and m bits inputted from the m-bit data path.

3. A data conversion function processor for performing a process of a data conversion function in a non-uniform MISTY structure which includes an n-bit data path and an m (m<n)-bit data path and to which the two data paths are connected by zero-extend conversion or truncate conversion in each stage, comprising:

a first exclusive OR calculator to calculate an exclusive OR of m bits inputted from the m-bit data path and m bits of an n-bit round key KIij2;

a concatenate conversion unit provided on a route connecting between the two data paths, to combine m bits outputted from the first exclusive OR calculator with (n−m) bits of the round key KIij2 by concatenate conversion to convert it to n bits;

a second exclusive OR calculator provided at a lower section of a branching point to the route of the m-bit data path, to calculate an exclusive OR of m bits outputted from the first exclusive OR calculator and m bits of the round key KIij2;

a third exclusive OR calculator to calculate an exclusive OR of lower-order m bits of the round key KIij2 and an m-bit round key KIij1; and a fourth exclusive OR calculator provided on the m-bit data path, to calculate an exclusive OR of m bits outputted from the third exclusive OR calculator and m bits inputted from the m-bit data path.

4. A data conversion function processor for performing a process of a data conversion function in a non-uniform MISTY structure which includes an n-bit data path and an m (m<n)-bit data path and to which the two data paths are connected by zero-extend conversion or truncate conversion in each stage, comprising:

a first exclusive OR calculator provided on a route connecting between the two data paths, to calculate an exclusive OR of m bits branched and inputted from the m-bit data path and lower-order m bits of an n-bit round key KIij2;

a concatenate conversion unit provided on a route connecting between the two data paths, to combine m bits inputted from the first exclusive OR calculator with (n−m) bits of a round key KIij2 by concatenate conversion to convert it to n bits;

a first truncate conversion unit to truncate-convert an n-bit round key KIij2 to m-bits;

a second truncate conversion unit provided on a second route connecting between the two data paths, to truncate-convert n bits branched and inputted from the n-bit data path, to m bits;

a second exclusive OR calculator provided on the second route, to calculate an exclusive OR of m bits outputted from the second truncate conversion unit and m bits outputted from the first truncate conversion unit;

a third exclusive OR calculator provided on the m-bit data path, to calculate an exclusive OR of m bits outputted from the second exclusive OR calculator and m bits inputted from the m-bit data path; and a fourth exclusive OR calculator provided on the m-bit data path, to calculate an exclusive OR of m bits outputted from the third exclusive OR calculator and an m-bit round key KIij1.

5. A data conversion function processor for performing a process of a data conversion function in a non-uniform MISTY structure which includes an n-bit data path and an m (m<n)-bit data path and to which the two data paths are connected by zero-extend conversion or truncate conversion in each stage, comprising:

a first exclusive OR calculator provided on a route connecting between the two data paths, to calculate an exclusive OR of m bits branched and inputted from the m-bit data path, and lower-order m bits of an n-bit round key KIij2;

a concatenate conversion unit provided on a route connecting between the two data paths, to combine m bits outputted from the first exclusive OR calculator with (n−m) bits of a round key KIij2 by concatenate conversion to convert it to n bits;

a second exclusive OR calculator to calculate an exclusive OR of lower-order m bits of the round key KIij2 and an m-bit round key KIij1;

a third exclusive OR calculator provided on the m-bit data path, to calculate an exclusive OR of m bits outputted from the second exclusive OR calculator and m bits inputted from the m-bit data path;

a fourth exclusive OR calculator provided on a second route connecting between the two data paths, to calculate an exclusive OR of m bits inputted from a branching point provided in an upper section of the third exclusive OR calculator on the m-bit data path and m bits outputted from the second exclusive OR calculator; and a zero-extend conversion unit provided on the second route, to zero-extend-convert m bits outputted from the fourth exclusive OR calculator to n bits.

6. The data conversion function processor according to claim 1, wherein an exclusive OR calculator arranged immediately below an n-bit input/output non-linear converter Sn is provided at a jointing point of a route connecting between the two data paths and the n-bit data path.

7. The data conversion function processor according to claim 1, wherein an m-bit input/output non-linear converter Sm is provided immediately below a connecting point between a route connecting between the two data paths and the m-bit data path.

8. A data conversion function processor for performing a process of a data conversion function in a non-uniform MISTY structure which includes an n-bit data path and an m (m<n)-bit data path and to which the two data paths are connected by zero-extend conversion or truncate conversion in each stage and calculating an exclusive OR of first (n+m)-bit data outputted from the data conversion function and second (n+m)-bit data inputted from outside the data conversion function, comprising:

a zero-extend conversion unit provided on a first route connecting between the two data paths, to zero-extend-convert m bits branching-point-inputted from the m-bit data path to n bits; and a first exclusive OR calculator provided on the first route, to calculate an exclusive OR of n bits outputted from the zero-extend conversion unit and n bits of the second (n+m) bits.

9. The data conversion function processor according to claim 8, wherein an n-bit input/output non-linear converter Sn is provided in an upper section of a jointing point of the first route and the m-bit data path.

10. The data conversion function processor according to claim 8, further comprising:

a zero-extend conversion unit provided on a second route connecting between the two data paths, to zero-extend-convert an n-bit round key KIij2 and m bits branched and inputted from the m-bit data path to n bits;

a second exclusive OR calculator provided on a second route connecting between the two data path, to calculate an exclusive OR of n bits outputted from the zero-extend conversion unit and an n-bit round key KIij2;

a third exclusive OR calculator to calculate an exclusive OR of lower-order m bits of an n-bit round key KIij2 and an m-bit round key KIij1; and a fourth exclusive OR calculator provided on the m-bit data path, to input m bits outputted from the third exclusive OR calculator.

11. The data conversion function processor according to claim 10, wherein an n-bit input/output non-linear converter Sn is provided in an upper section of a jointing point of the second route and the n-bit data path.

12. A data conversion function processor for performing a process of a data conversion function in a non-uniform MISTY structure which includes an n-bit data path and an m (m<n)-bit data path and to which the two data paths are connected by zero-extend conversion or truncate conversion in each stage and calculating an exclusive OR of first (n+m)-bit data outputted from the data conversion function and second (n+m)-bit data inputted from outside the data conversion function, comprising:

a first exclusive OR calculator provided on a route connecting between the two data paths, to calculate an exclusive OR of the m bits of the second (n+m) bits and m bits branched and inputted from the m-bit data path; and a concatenate conversion unit to combine m bits outputted from the first exclusive OR calculator and (n−m) bits of the second (n+m) bits by concatenate conversion to convert it to n bits and outputting the n-bits to the n-bit data path.

13. The data conversion function processor according to claim 12, wherein the branched and inputted m bits are an output of a second exclusive OR calculator provided on the above m-bit data path to which a round key KIij1 is inputted.

14. A data conversion function processor for performing a process of a data conversion function in a non-uniform MISTY structure which includes an n-bit data path and an m (m<n)-bit data path and to which the two data paths are connected by zero-extend conversion or truncate conversion in each stage and calculating an exclusive OR of first (n+m)-bit data outputted from the data conversion function and second (n+m)-bit data inputted from outside the data conversion function, comprising:

a first exclusive OR calculator provided on the m-bit data path, to calculate an exclusive OR of lower-order m bits of the second (n+m) bits and m bits inputted from the m-bit data path;

a concatenate conversion unit to combine m bits inputted from a branch point provided in a lower section of the first exclusive OR calculator on the m-bit data path with the higher-order (n−m) bits of the second (n+m) bits by concatenate conversion to convert it to n bits and outputting the n bits to the n-bit data path; and a second exclusive OR calculator to calculate an exclusive OR of m bits inputted from a lower section of the branching point on the m-bit data path and lower-order m bits of the (n+m) bits.

15. A data conversion function processor for performing a process of a data conversion function in a non-uniform MISTY structure which includes an n-bit data path and an m (m<n)-bit data path and to which the two data paths are connected by zero-extend conversion or truncate conversion in each stage and calculating an exclusive OR of first (n+m)-bit data outputted from the data conversion function and second (n+m)-bit data inputted from outside the data conversion function, comprising:

a first exclusive OR calculator provided on a first route connecting between the two data paths, to calculate an exclusive OR of m bits branching-point-inputted from the m-bit data path and m bits of an n-bit round key KIij2;

a concatenate conversion unit provided on the first route, to combine m bits outputted from the first exclusive OR calculator and second (n−m) bits of the round key KIij2 by concatenate conversion to convert it to n-bits;

a second exclusive OR calculator to calculate an exclusive OR of lower-order m bits of the round key KIij2 and an m-bit round key KIij1;

a third exclusive OR calculator provided on the m-bit data path, to calculate an exclusive OR of m bits outputted from the second exclusive OR calculator and m bits inputted from the m-bit data path;

a zero-extend conversion unit provided on a second route connecting between the two data paths, to zero-extend-convert m bits branching-point-inputted from the m bit data path to n bits; and a fourth exclusive OR calculator provided on the second route, to calculate an exclusive OR of n bits outputted from the zero-extend conversion unit and higher-order n bits of the second (n+m) bits.

16. A data conversion function processor for performing a process of a data conversion function in a non-uniform MISTY structure which includes an n-bit data path and an m (m<n)-bit data path and to which the two data paths are connected by zero-extend conversion or truncate conversion in each stage and calculating an exclusive OR of first (n+m)-bit data outputted from the data conversion function and second (n+m)-bit data inputted from outside the data conversion function, comprising:

a zero-extend conversion unit provided on a first route connecting between the two data paths, to zero-extend-convert m bits branching-point-inputted from the m-bit data path to n bits;

a first exclusive OR calculator provided on the first route, to calculate an exclusive OR of n bits outputted from the zero-extend conversion unit and n bits of the second (n+m) bits;

a second exclusive OR calculator to calculate an exclusive OR of lower-order m bits of the round key KIij2 and an m-bit round key KIij1;

a third exclusive OR calculator provided on the m-bit data path, to calculate an exclusive OR of m bits outputted from the second exclusive OR calculator and m bits inputted from the m-bit data path;

a fourth exclusive OR calculator provided on a second route connecting between the two data paths, to calculate an exclusive OR of m bits branching-point-inputted from the m-bit data path and m bits of the second (n+m) bits; and a concatenate conversion unit provided on the second route, to combine m bits outputted from the fourth exclusive OR calculator and (n−m) bits of the second (n+m) bits by concatenate conversion to convert it to n bits.

17. The data conversion function processor according to claim 16, wherein m bits inputted from the m-bit data path to the fourth exclusive OR calculator are an output of the third exclusive OR calculator.

18. A data conversion function processor for performing a process of a data conversion function in a non-uniform MISTY structure which includes an n-bit data path and an m (m<n)-bit data path and to which the two data paths are connected by zero-extend conversion or truncate conversion in each stage and calculating an exclusive OR of first (n+m)-bit data outputted from the data conversion function and second (n+m)-bit data inputted from outside the data conversion function, comprising:

a first exclusive OR calculator provided on a first route connecting between the two data paths, to calculate an exclusive OR of m bits branched and inputted from the m-bit data path and lower-order m bits of an n-bit round key KIij2;

a first concatenate conversion unit to combine m bits outputted from the first exclusive OR calculator with (n−m) bits of the round key KIij2 by concatenate conversion to convert it to n bits;

a second exclusive OR calculator to calculate an exclusive OR of lower-order m bits of the round key KIij2 and an m-bit round key KIij1;

a third exclusive OR calculator provided on the m-bit data path to which m bits outputted from the second exclusive OR calculator are inputted;

a fourth exclusive OR calculator provided on a second route connecting between the two data paths, to calculate an exclusive OR of e lower-order m bits of the second (n+m) bits and m bits branched and inputted from the m-bit data path; and a second concatenate conversion unit provided on the second route, to combine m bits outputted from the fourth exclusive OR calculator and higher-order (n−m) bits of the second (n+m) bits by concatenate conversion to convert it to n bits.

19. The data conversion function processor according to claim 18, wherein m bits branched and inputted from the m-bit data path to the fourth exclusive OR calculator are outputted from the third exclusive OR calculator.

20. The data conversion function processor according to claim 19, wherein an n-bit input/output non-linear converter Sn is provided in an upper section of a jointing point of the first and second routes and the n-bit data path.

* * * * *